(12) United States Patent
Vembu et al.

(10) Patent No.: US 11,057,325 B2
(45) Date of Patent: Jul. 6, 2021

(54) METHODS AND APPARATUS FOR ENHANCED COMMUNICATION IN EMAIL APPLICATIONS

(71) Applicant: Zoho Corporation Private Limited, Pleasanton, CA (US)

(72) Inventors: Radha Vembu, Chennai (IN); Jagan Ranganathan, Chennai (IN); Ravikumar Govindarajan, Chennai (IN); Sridhar Vembu, Pleasanton, CA (US); Rajendran Dandapani, Chennai (IN); Bharath Sridhar, Cupertino, CA (US); Sudheer A Grandhi, Pleasanton, CA (US)

(73) Assignee: Zoho Corporation Private Limited, Kanchipuram (IN)

( * ) Notice: Subject to any disclaimer, the term of this patent is extended or adjusted under 35 U.S.C. 154(b) by 910 days.

(21) Appl. No.: 15/008,818

(22) Filed: Jan. 28, 2016

(65) Prior Publication Data
US 2016/0149848 A1 May 26, 2016

Related U.S. Application Data

(63) Continuation-in-part of application No. 14/961,701, filed on Dec. 7, 2015, which is a continuation-in-part of application No. 14/861,160, filed on Sep. 22, 2015, now abandoned, and a continuation-in-part of application No. 14/861,160, filed on Sep. 22, 2015, now abandoned.

(60) Provisional application No. 62/280,307, filed on Jan. 19, 2016, provisional application No. 62/181,960, filed on Jun. 19, 2015, provisional application No. 62/120,696, filed on Feb. 25, 2015, provisional application No. 62/111,037, filed on Feb. 2, 2015, provisional application No. 62/089,034, filed on Dec.

(Continued)

(51) Int. Cl.
H04L 29/08 (2006.01)
H04L 12/58 (2006.01)

(52) U.S. Cl.
CPC .............. *H04L 51/12* (2013.01); *H04L 51/08* (2013.01); *H04L 51/14* (2013.01); *H04L 51/16* (2013.01); *H04L 51/36* (2013.01); *H04L 51/38* (2013.01); *H04L 67/10* (2013.01)

(58) Field of Classification Search
CPC ....................................................... H04L 51/12
USPC ....................................................... 709/206
See application file for complete search history.

(56) References Cited

U.S. PATENT DOCUMENTS 5,671,428 A 9/1997 Muranaga et al.
7,451,186 B2 11/2008 Morinigo et al.
(Continued)

OTHER PUBLICATIONS

Unknown, Collaboration in Office 365, web page printout, retrieved Mar. 11, 2015, Microsoft.
(Continued)

*Primary Examiner* — Adnan M Mirza
(74) *Attorney, Agent, or Firm* — Mark Lauer; Arthur Behiel; Silicon Edge Law Group LLP

(57) ABSTRACT

A method and system for providing a communication stream for associating messages are described. A communication stream receives various message types including messages, posts, events, tasks, and comments, and presents them to users. Private messages relating to one or more messages may be sent between and among one or more users.

22 Claims, 17 Drawing Sheets

Related U.S. Application Data 8, 2014, provisional application No. 62/054,683, filed on Sep. 24, 2014.

(56) References Cited

U.S. PATENT DOCUMENTS

| | | | |
|---|---|---|---|
| 7,680,895 B2 * | 3/2010 | Perlow | H04L 51/36 709/206 |
| 7,698,368 B2 | 4/2010 | Muller et al. | |
| 8,041,770 B1 * | 10/2011 | Schmidt | G10L 19/20 709/206 |
| 8,219,626 B2 | 7/2012 | Muller et al. | |
| 8,583,741 B2 | 11/2013 | Perlow et al. | |
| 2002/0010743 A1 | 1/2002 | Ryan et al. | |
| 2005/0015451 A1 | 1/2005 | Sheldon et al. | |
| 2006/0137007 A1 | 6/2006 | Paatero et al. | |
| 2006/0195781 A1 | 8/2006 | Jatavallabha et al. | |
| 2007/0118598 A1 | 5/2007 | Bedi et al. | |
| 2009/0307315 A1 | 12/2009 | Murphy, Jr. et al. | |
| 2014/0173423 A1 | 6/2014 | Meisels et al. | |

OTHER PUBLICATIONS

MOTA, Exchange 2013 Preview—Public Folders (Part 1), Sep. 11, 2012, TechGenix Ltd (MSExchange.org).
MOTA, Exchange 2013 Preview—Public Folders (Part 2), Sep. 25, 2012, TechGenix Ltd (MSExchange.org).
Koppes, An End-to-End Experience with Groups, undated, retrieved Mar. 11, 2015, Microsoft.
Unknown, Exchange Public Folders, web page printout, retrieved Feb. 13, 2015, Imperial College London.
Redmond, Microsoft turns off the last public folder in their internal Exchange deployment, Oct. 14, 2014, WindowsITPrc.
Tulloch, Chapter 3-Directory (Public Folder), Microsoft Exchange Server in a Nutshell, pp. 212-220, Apr. 1999, First Edition, O'Reilly & Associates, Sebastopol, CA, USA.
Isaac, Slack, a Start-up With an App to Foster Business Collaboration, Is Valued at $1.1 Billion, Oct. 31, 2014, The New York Times Company.
Manjoo, Slack, the Office Messaging App That May Finally Sink Email, Mar. 11, 2015, The New York Times Company.
Non-final Office action in U.S. Appl. No. 15/008,818, dated Oct. 19, 2017, 8 pages.
Non-final Office action in U.S. Appl. No. 14/861,160, dated Nov. 30, 2017, 11 pages.
In view of *McKesson Information Solutions* v. *Bridge Medical* (Fed. Cir. 2007), the applicant wishes to inform the Examiner that the above-identified pending application is a parent application of U.S. Appl. No. 15/288,002. The Examiner is encouraged to review the art made of record and any pertinent information contained in the file wrappers for the aforementioned related application.

\* cited by examiner

METHODS AND APPARATUS FOR ENHANCED COMMUNICATION IN EMAIL APPLICATIONS

FIELD

The present invention relates generally to methods and systems for providing electronic messaging.

BACKGROUND

Conventional electronic messaging systems deliver a plethora of messages to users on a nearly continuous basis. Messages are of various types including e-mail, event, calendar item, post, task, comment, and document, and are typically stored and presented to users via distinct and separate platforms, e.g., a dedicated web browser page or mobile application provides e-mails, another browser or mobile application provides calendar items, perhaps another platform for comments, and so forth. Disparate messages are often related topically, or by individual, e.g., team members collaborating on a project. For example, team members collaborating on a project may need to access a common set of messages, events, posts, tasks, comments, and documents relating to the project. Conventional electronic messaging systems with their disparate platforms inherently lack integration, and therefore present a formidable challenge for groups of users needing unified access to topically related messages, thereby hampering collaboration and productivity.

BRIEF DESCRIPTION OF THE DRAWINGS

The subject matter presented herein is illustrated by way of example, and not by way of limitation, in the figures of the accompanying drawings and in which like reference numerals refer to similar elements and in which.

DETAILED DESCRIPTION

A communication stream aggregates electronic messages of arbitrary types and makes them available to stream users. Thus, messages, e.g., events, tasks, posts, comments, and documents, are conveniently accessible to users in a simple, intuitive, and unified way. FIGS. 1A-1D respectively depict computer-implemented systems 100A-100D for providing communication streams for messages.

By way of example and without limitation, application of a communication stream to a product development project is briefly described. A communication stream corresponding to a product development project is created, and members of a product development team join the stream as users. With certain exceptions, e.g., private messages, members may view and participate, and have access to messages in, the product development communication stream. Team members communicate as the project moves forward, submitting messages to the stream through, e.g., messages, events, tasks, posts, comments, and documents. Over time, a body of product development history grows within the stream. Team membership naturally changes over time as some members leave, and others join. A new team member, once joined to the stream, has access to the body of product development history. The new member may therefore advantageously and expeditiously "onboard" herself to the project simply by reviewing the stream, thereby avoiding a need to resort to unreliable word-of-mouth "folklore" as often occurs. This is especially advantageous when a new team member steps into a supervisory role, e.g., to oversee an existing project. Team members not authorized to view an entire stream are allowed limited access to one or more streams in accordance with one embodiment. For example, a team member may be allowed to participate in a stream by time, e.g., within one or more date ranges, e.g., January-July 2014; September-November 2014, by stream message type, e.g., messages, events, posts, or by any combination of times and types. A plurality of communication streams, e.g., one stream per product development project, enables efficient scaling by capturing a body of information for each project. Similarly, communication streams find useful application in other situations, including, e.g., sales and marketing campaigns, customer relationship matters, election campaigns in a political context, and client matters in a legal, financial, or other professional services settings.

Figure 2A:
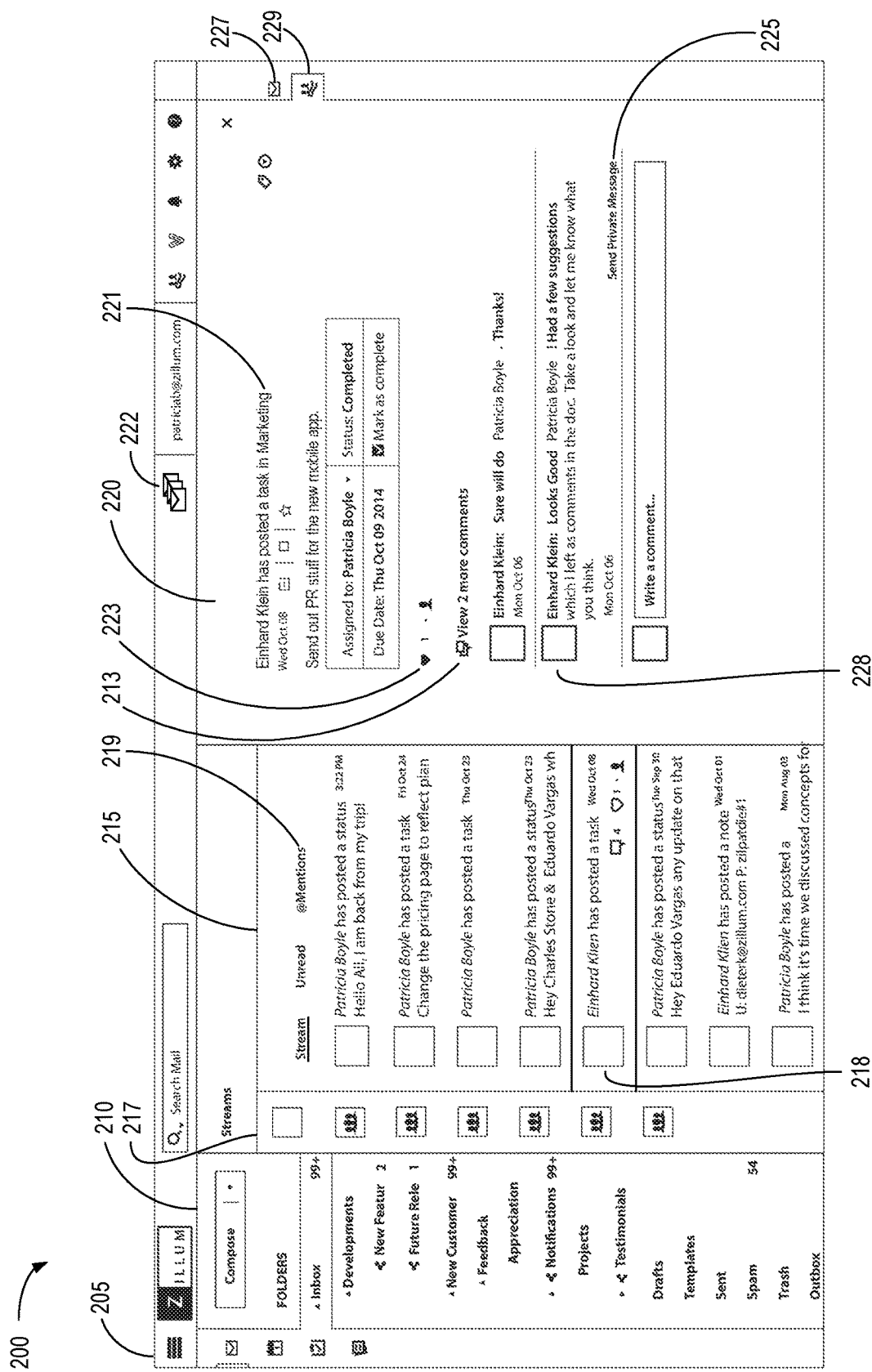
FIGS. 2A-2C depict visual presentations of a plurality of communication streams and email messages in accordance with various embodiments.

A user interface, e.g., as depicted in FIG. 2A, provides users with clean and unencumbered access to one or more communication streams. The user interface, elements of which are provided by UI service 107, is presented on numerous platforms including, e.g., a web browser, natively or in combination with a browser plug-in or extension, a mobile application, and in a conventional e-mail client such as Microsoft Outlook® in combination with a plug-in or extension. Although UI service 107 is depicted within communication server 102 and described herein (for convenience of description) as if it were a centralized service, a UI service may also be distributed. For example, UI service 132, depicted within email server 131, may serve some or all clients, and UI service 107 may also serve some or all clients, in accordance with one embodiment. More generally and in another embodiment, a UI service may be deposed separately and need not reside in any particular server such as servers 102 or 131. A more complete description of a user interface for providing user access to one or more communication streams is provided below with respect to FIG. 2A.

Figure 1A:
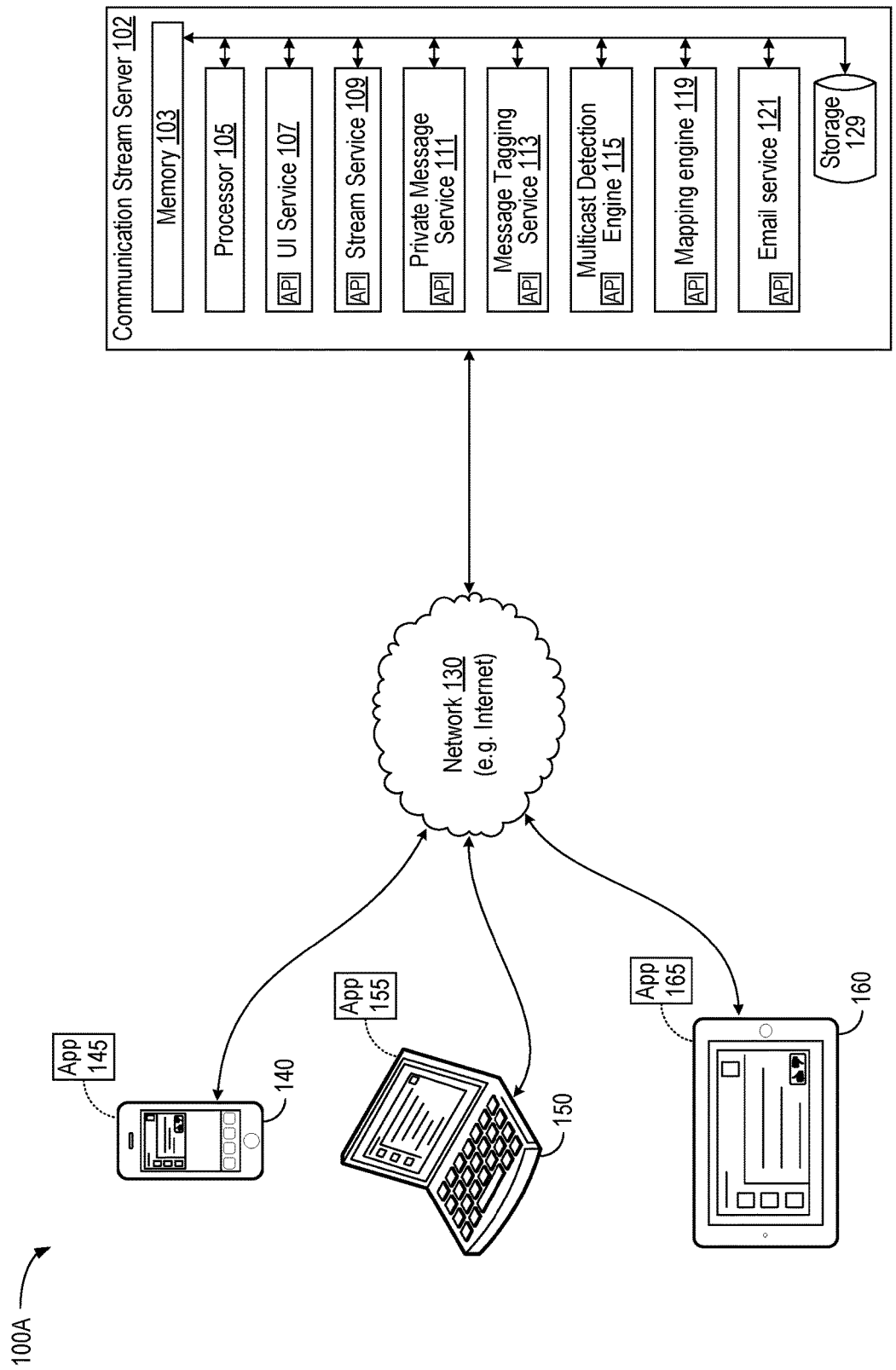
FIG. 1A depicts a computer-implemented system for providing a communication stream for messages in accordance with one embodiment.

FIG. 1A depicts a computer-implemented system for 100A providing a communication stream for messages in accordance with one embodiment. A communication stream server 102 includes memory 103, the memory for at least holding processor instructions, a processor 105, and storage 129. Server 102 includes a network interface (not shown) to access a network 130 for communicating with other systems, e.g., email servers and other messaging systems, customer relationship management ("CRM") systems, high-availability replicas of server 102, cloud services, and client devices, e.g., 140, 150, and 160. Network 130 includes one or more types of networks, for example, private and public networks, local (LAN) and wide area (WAN) networks, wired, wireless, and cellular networks, and the Internet. Software implementing and relating to services 107, 109, 111, 113, 115, 119, and 121, reside in storage 129, and may also reside in whole or in part in a location accessible via network 130, are loaded into memory 103, and executed by processor 105. Storage 129 also includes one or more databases comprising procedures, data structures, and tables, e.g., 300, 400, and 1000 depicted respectively in FIGS. 3, 4, and 10. Any portion of the databases may be accessed and operated upon from storage 129, memory 103, or a location accessible via network 130, by the services.

Communication stream server 102 includes accounts for users, also referred to as members. A member is identified by a user I.D., e.g., user001, and is granted access to the member's user account on communication stream server 102 via the user I.D. and a password. Stream service 109, with reference to data structures 300 and 400, creates communication streams, joins users to the communication streams, processes messages, and is involved in managing interrelationships among messages, streams, and users.

Stream service 109 receives an email message in one aspect, the message having commands for creating a communication stream. The message includes a return address, and the commands specify a stream identifier. Responsive to the commands, stream service 109 creates the stream and assigns the stream identifier to the stream. If stream service 109 detects erroneous commands, it transmits a message to the return address identifying the errors. Stream service 109 detects errors in replies it may receive, and repeats (iterates) until it detects an acceptably low number of errors, or receives a termination command.

UI service 107, in communication with stream service 109, provides a representation of one or more communication streams having one or more users or members, e.g., as depicted in FIG. 2A. Members of a stream by default have access to all messages within the stream. A Private message service 111 enables an exception to the default by providing for access to a message by fewer than all members. Such a message is a private message. Private message service 111 references private table 340 and anchor table 350 respectively to manage user access to messages, and to associate, or anchor, one or more messages (typically but not necessarily private) to another message (typically but not necessarily non-private). A more detailed description of private messages is provided with reference to FIGS. 3 and 4 below. Message tagging service 113, with reference to tables 330 and 420, associates one or more messages with one or more tags. A tag provides for intelligent and enhanced searching of stream content.

A multicast detection engine 115, a service for identifying multicast messages, analyzes one or more email messages and determines whether the one or more messages may be a bulk transmission, e.g., to a plurality of recipients. A bulk transmission may be formatted as a unicast message to multiple recipients in a single domain (e.g., zoho.com), each message including a personalized greeting, or it may be a multicast message, e.g., a single message directed to a distribution group (mailing list). Bulk transmissions include, e.g., newsletters, ads, and solicitations involving coupon offers. Multicast detection engine 115 identifies bulk transmissions by analyzing incoming email headers for similarities, e.g., source IP address, in accordance with one embodiment. In another aspect, multicast detection engine 115 detects and compares message text, e.g., by pattern detection, and heuristically-based lexicographical analysis. Specific triggering criteria, e.g., a specific source IP address, and message count, e.g., 50 or 100 messages, are employed in accordance with one embodiment. Upon detection of a bulk transmission, multicast detection engine 115 identifies recipients of the bulk transmission as such, maintaining a corresponding list of user I.D.s, and initiating creation of a communication stream. Multicast detection engine 137 in email server 131 (FIGS. 1B-1D) is included as another configuration and performs similar functionality as multicast detection engine 115 in communication stream server 102. Engines 115 and 137 may be used by server 102 or 131 in any combination. In certain applications, multicast detection engine 137 in an email server, e.g., email server 131, may be a preferable configuration. Returning to multicast detection engine 115, once it identifies a bulk transmission, for example a unicast or multicast newsletter or sales solicitation involving a coupon offer, it makes a request of stream service 109 to create a communication stream, including with its request a stream identifier, e.g., bulk1@zoho.com. In response, stream service 109 creates a stream. Stream service 109 notifies the users, e.g., via an email including a link to the stream, or via return address, with invitations to subscribe to the communication stream. Stream service 109 receives responses to the invitations, joins users, and provides a presentation of the communication stream, including the message, to the user. In one embodiment, the presentation is via a return email message. In another aspect, the presentation is via a stream interface provided by UI service 107.

UI service 107 displays one or more UI-focused and context-sensitive bulk transmission indications to alert a user to the presence of a bulk transmission. In one embodiment, UI service 107 displays a UI-focused indication, e.g., command icon 272 depicted in email interface 250 in FIGS. 2B-2C. A command icon 222 performs a similar function in communication stream interface 200 depicted in FIG. 2A. Accordingly, references to command icon 272 also apply to command icon 222. Asserting command icon 272 displays communication stream menu 271 (FIG. 2B), by which a user may identify and join one or more communication streams relating to one or more bulk transmissions. Menu item 264 identifies a first stream corresponding to a bulk transmission identified as "Bulk1@zoho.com" Menu item 264 further indicates the bulk transmission was sent by "news@notzillium.com" with subject "Software coding newsletter." Examination of email message list 265 reveals email message 278 is indeed a bulk transmission, further identified by a letter "B" 268 appearing to the left of email message 278. Asserting menu item 264, e.g., by "clicking" on it, or on "Join" icon 269, causes the user to join the communication stream Bulk1@zoho.com. In one aspect, command icon 272 is invisible in the absence of bulk transmissions. In another aspect, command icon 272 is visible and muted, e.g., "greyed out" in the absence of bulk transmissions. In yet a further aspect, UI service 107 flashes command icon 272 when multicast detection engine 119 signals to UI service 107 that it has detected a bulk transmission. In a still further aspect, UI service 107 colors command icon 272 when signaled by 119 that it has detected a bulk transmission. In yet a further aspect, UI service 107 displays a text message, e.g., in a "bubble" within view 255, also view 205 for the communication stream depicted in FIG. 2A, to alert a user of a detected bulk transmission. The command icon, e.g., command icon 272, is UI-focused because it appears in an area independent of a message-viewing context. For example, command icon 272 appears in the periphery of view 255 (205), neither interfering with nor depending on activity, e.g., viewing a stream message, a stream message list as depicted in view 205, or an email message list as depicted in view 255.

Figure 2B:
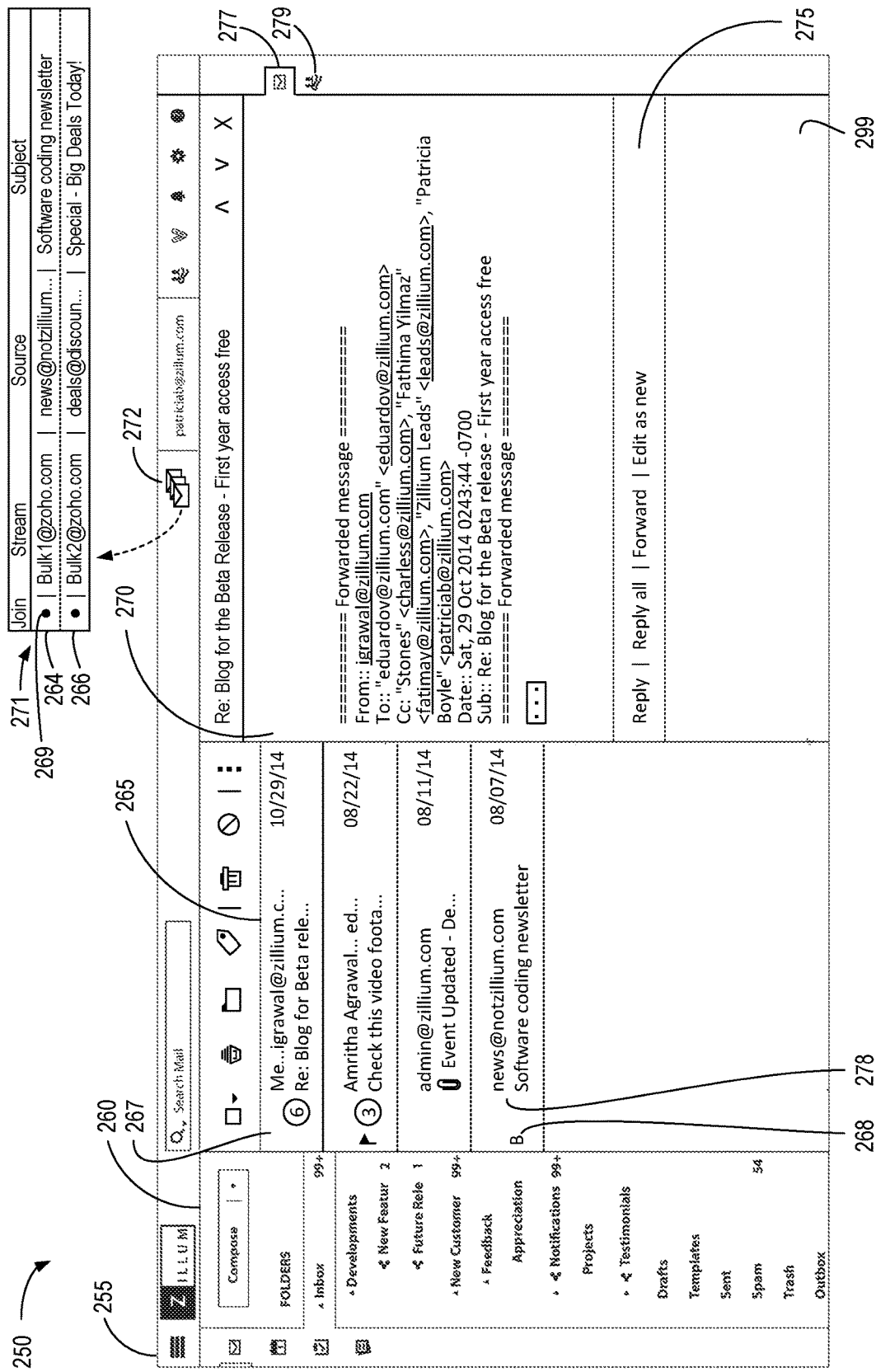
Figure 2C:
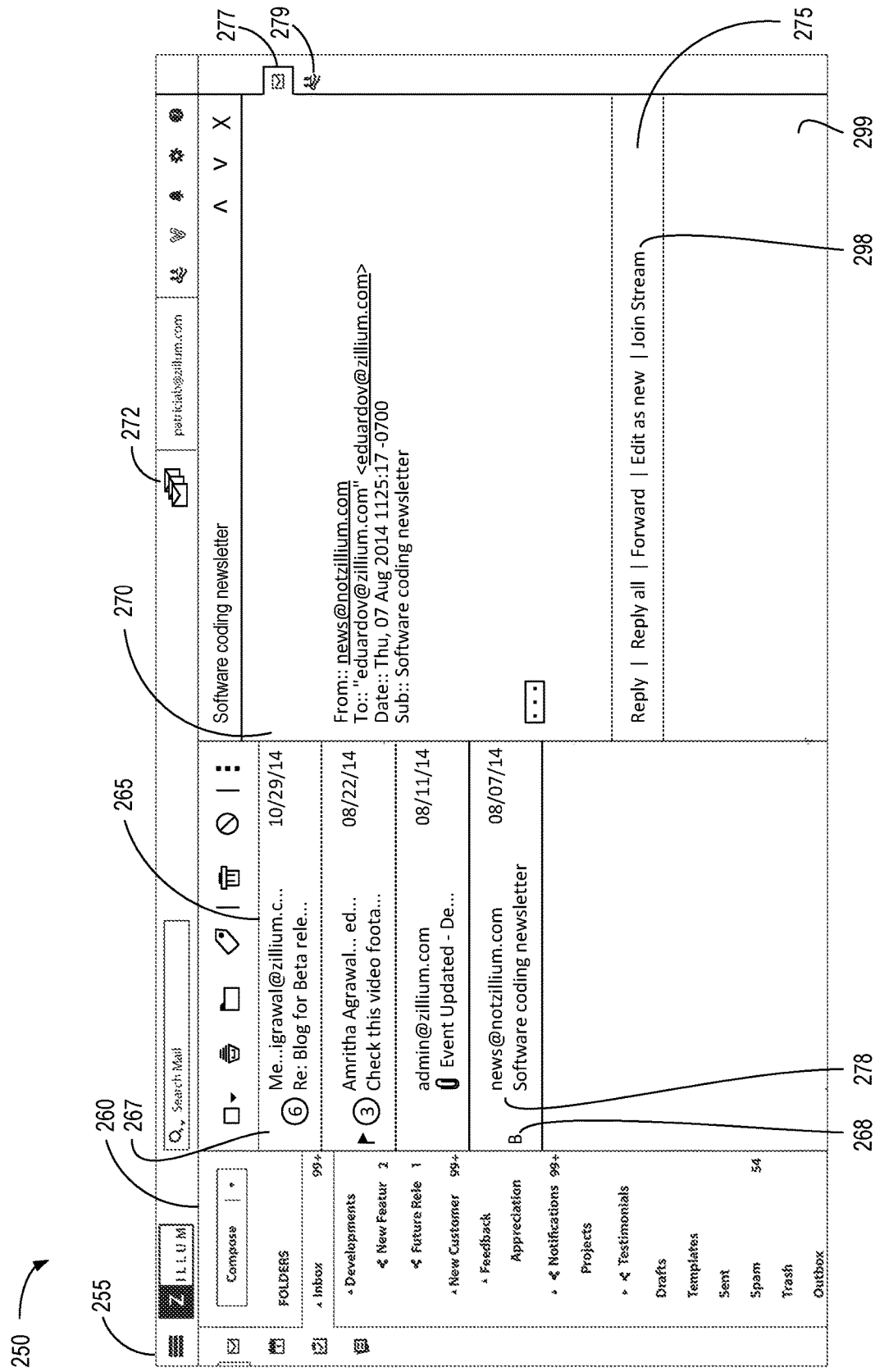

In another embodiment, UI service 107 provides one or more context-sensitive indications to an email viewing window 255, depicted in FIG. 2C, e.g., when an email message corresponding to a bulk transmission, e.g., email message 278, is being displayed, e.g., in viewing pane 270, a "Join Stream" menu item 298 appears alongside conventional menu items such as "Forward" and "Reply" in context-sensitive menu 275. In yet another embodiment, UI service 107 provides a context-sensitive indication, e.g., a letter "B" 268, adjacent to an email message, e.g., 278 in an email message list, e.g., 265, or along with a view of an email message corresponding to the bulk transmission, e.g., while displaying email message 278 in viewing pane 270. In one embodiment, the indication is an icon, and in another embodiment, the indication is an icon, icon attributes, and text, including one or more numbers. The indication may include information, e.g., an icon, e.g., flashing or highlighted, indicating that a new stream corresponding to the bulk transmission has been created; identifying new or unread messages in the stream; displaying counts of new and unread stream messages in the stream; a count of the stream messages in the stream; or displaying stream messages. UI service 107 may support a user interface to display context-sensitive indications in various configurations. Some indications may be displayed in response to activation of other indications, e.g., stream messages may be displayed when an icon or an icon-number pair is activated. For example, UI service 107 may determine to display the letter "B" 268 alongside an email message in an email message list, e.g., email message list 265. In another aspect, UI service 107 may display an icon alongside a number indicating a count of stream messages in email message list 265, when, e.g., list 265 is sized larger than depicted in FIGS. 2B and 2C, instead of letter "B" 268, and a number inside an icon when, e.g., list 265 is sized smaller than depicted in FIGS. 2B and 2C. In yet another aspect, UI service 107 may determine, in response to viewing an email message corresponding to a bulk transmission in viewing panel 270, to display a list of corresponding stream messages in a separate window, or "bubble," if sufficient display space is unavailable in, e.g., viewing panel 299. In another aspect, in response to activation of an icon corresponding to a bulk email while viewing an email message in a viewing pane, e.g., viewing pane 270, stream messages may be displayed in a portion of email message viewing pane 270. In yet a further aspect, in response to activating an icon appearing in an email message list, e.g., email message list 265, only new stream messages are displayed in a separate window, or "bubble."

In one embodiment, a bulk transmission arrives in a user's email interface before multicast detection 119 has completed detection. In that instance, the one or more bulk transmission indications will not initially appear. For example, an indicator in an email message list would be absent initially, but would automatically appear later after multicast detection engine 119 finishes identifying the bulk transmission, and provides UI service 107 with bulk transmission indications. In another embodiment, an email message corresponding to a bulk transmission arrives in the user's email interface after multicast detection engine 119 finishes identifying a bulk transmission and providing UI service 107 with bulk transmission indications. In this instance, UI service 107 displays the one or more bulk transmission indications contemporaneously when the email message corresponding to the bulk transmission arrives. UI-focused indications, e.g., command icon 272, may be displayed immediately. For example, communication stream menu 271 includes menu item 266 corresponding to a bulk transmission not yet received in email message list 265. Menu item 266 indicates stream "Bulk2@zoho.com" corresponds to a bulk transmission from "deals@discoun . . . " with subject "Special—Big Deals Today!" Asserting menu item 266 enables a user to join stream "Bulk2@zoho.com" even before the email message corresponding to that bulk transmission appears in email message list 265. Context-sensitive indications are instead displayed in an appropriate context, e.g., "Join Stream" menu item 298 appears in context-sensitive menu 275 when displaying, e.g., email message 278 in viewing pane 270 corresponding to the bulk transmission, and an indicator, e.g., the letter "B" 268 may appear alongside email message 278 in email message list 265, or along with an email message open for viewing. In another aspect, an email message arrives in the users' email interface before multicast detection engine 119 finishes identifying a bulk transmission and providing UI service 107 with bulk transmission indications. In that instance, the view of messages, e.g., message list 265, would not include an indication of a bulk transmission, e.g., the letter "B" 268 depicted in message list 265 would be absent. The absent letter "B" 268 would automatically appear later, however, after bulk transmission detection completes.

Application programming interfaces ("APIs," "API") are provided by services, e.g., email service 121, 137, and stream service 109, and enable services to interact with other services, and software components or entities. For example, an API receives a request from a software entity, and appropriately handles, directs, and responds to the request. APIs are depicted within rectangles/blocks in FIGS. 1A-1D. Mapping engine 119 provides exporting or "mapping" services between a communication stream and various message types, and vice-versa, e.g., stream-to-email, email-to-stream, and one-or-more types to one-or-more message types. In one embodiment, exporting or mapping a message includes transforming one or more messages to one or more types, e.g., from one or more stream messages to one or more email messages. In another embodiment, responsive to a request to transmit a message to an email address, the methods and systems described enable transmitting the message to the email address. Email service 121 within communication stream server 102, and email service 136 within email server 131, which includes memory 133, processor 135, and storage 139, provide conventional electronic mail messaging services.

Figure 1B:
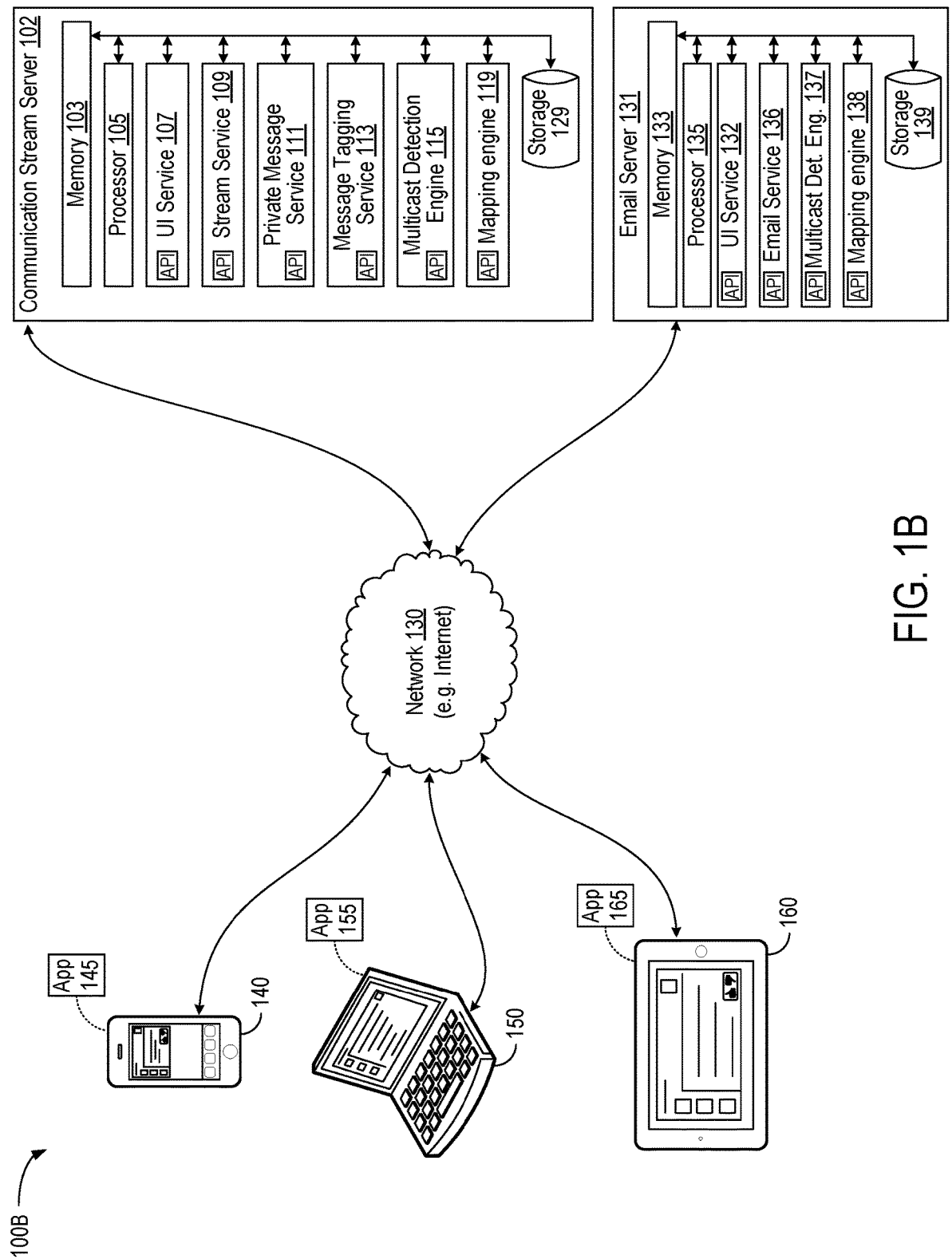
FIG. 1B depicts a computer-implemented system for providing a communication stream for messages in accordance with another embodiment.

FIG. 1B depicts a computer-implemented system for 100B providing a communication stream for messages in accordance with another embodiment. This embodiment includes two servers: communication stream server 102 sans the email service 121 depicted in FIG. 1A, and an email server 131. Email server 131 includes memory 133, processor 135, UI service 132, and an email service 136. UI service 107, in communication with email service 136, provides an email interface to one or more users. The email interface includes a command link (button). When activated, the command signals UI service 107 to create an interface for creating a communication stream based on a new or existing email message. A user within an organization, e.g., @zoho.com or @supermail.com, may thereby conveniently initiate creation of a communication stream based on a new or existing email within the email interface. Multicast detection engine 137 and mapping engine 138 respectively perform similar services in email server 131 as do multicast detection engine 115 and mapping engine 119 in communication stream server 102. Including mapping service 138 in email server 131 enables a distributed mapping architecture, in which message mapping relating to servers 102 and 131 occur within the respective server. The distributed mapping architecture provides greater flexibility than a centralized architecture, e.g., as depicted in FIG. 1A because different services, e.g., chat, and CRM, may be introduced or expanded in one service, e.g., mapping service 138, without burdening another, e.g., mapping service 119. In a distributed mapping architecture, distributed services and modules, e.g., services 119 and 138, inter-communicate to facilitate mapping across services. Communication between mapping services 119 and 138 is accomplished via APIs, in which services poll one another, e.g., at certain intervals in accordance with one embodiment. Communication between mapping services 119 and 138 is accomplished via "webhook," in which service 119 pushes data to service 138 and vice-versa via, e.g., a callback or interrupt-driven mechanism in accordance with another embodiment.

Figure 1C:
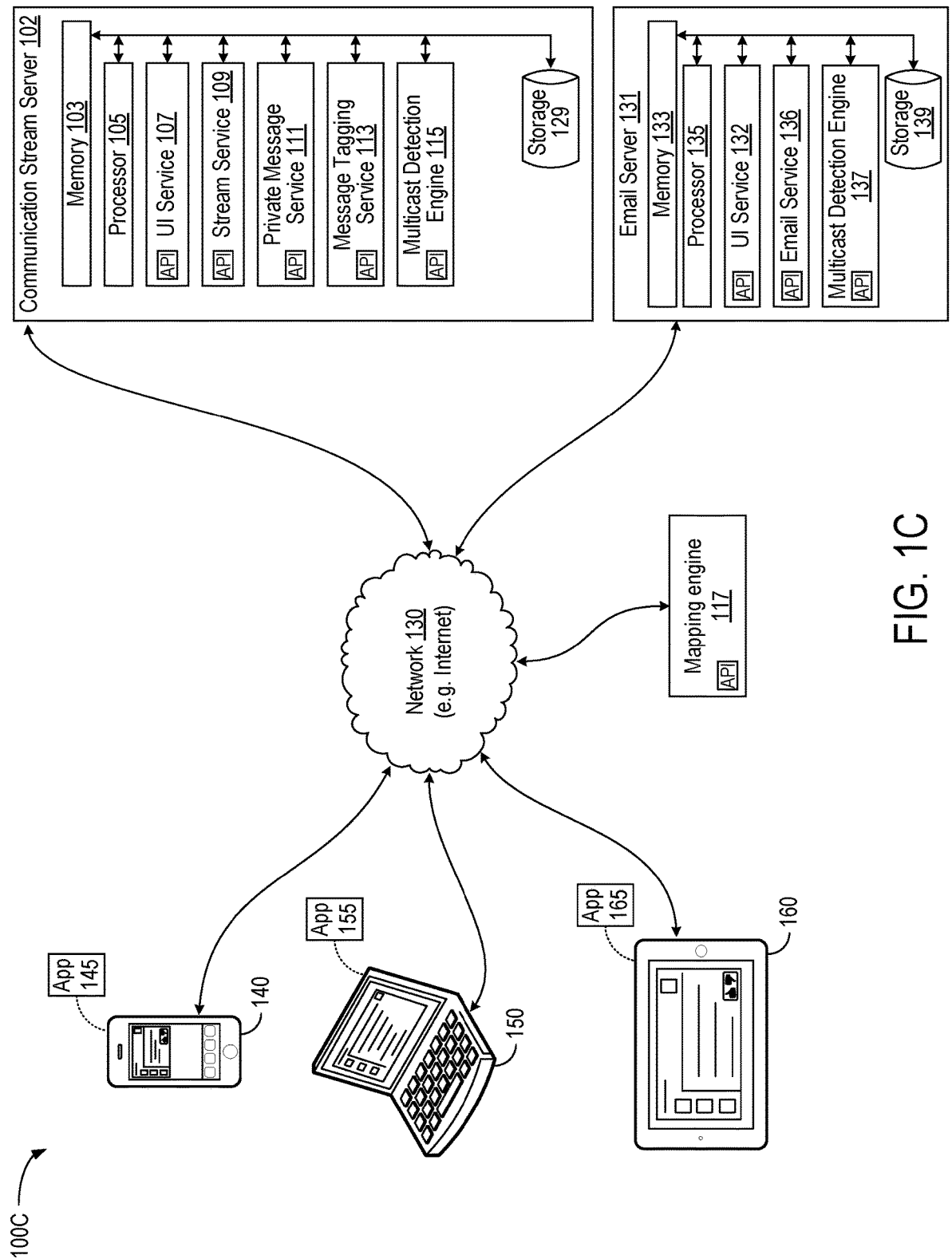
FIG. 1C depicts a computer-implemented system for providing a communication stream for messages in accordance with another embodiment.

FIG. 1C depicts a computer-implemented system 100C for providing a communication stream for messages employing a centralized mapping architecture in accordance with another embodiment. System 100C employs a stand-alone centralized mapping engine 117 attached to network 130. In this embodiment, neither server 102 nor server 131 includes a mapping engine. Instead, mapping engine 117 centrally provides mapping between, e.g., email and stream messages, similar to the mapping provided by mapping engine 119 of system 100A (FIG. 1). As a standalone service, however, it may be deployed virtually anywhere and is thus available to multiple servers, e.g., on an outsourced basis.

Figure 1D:
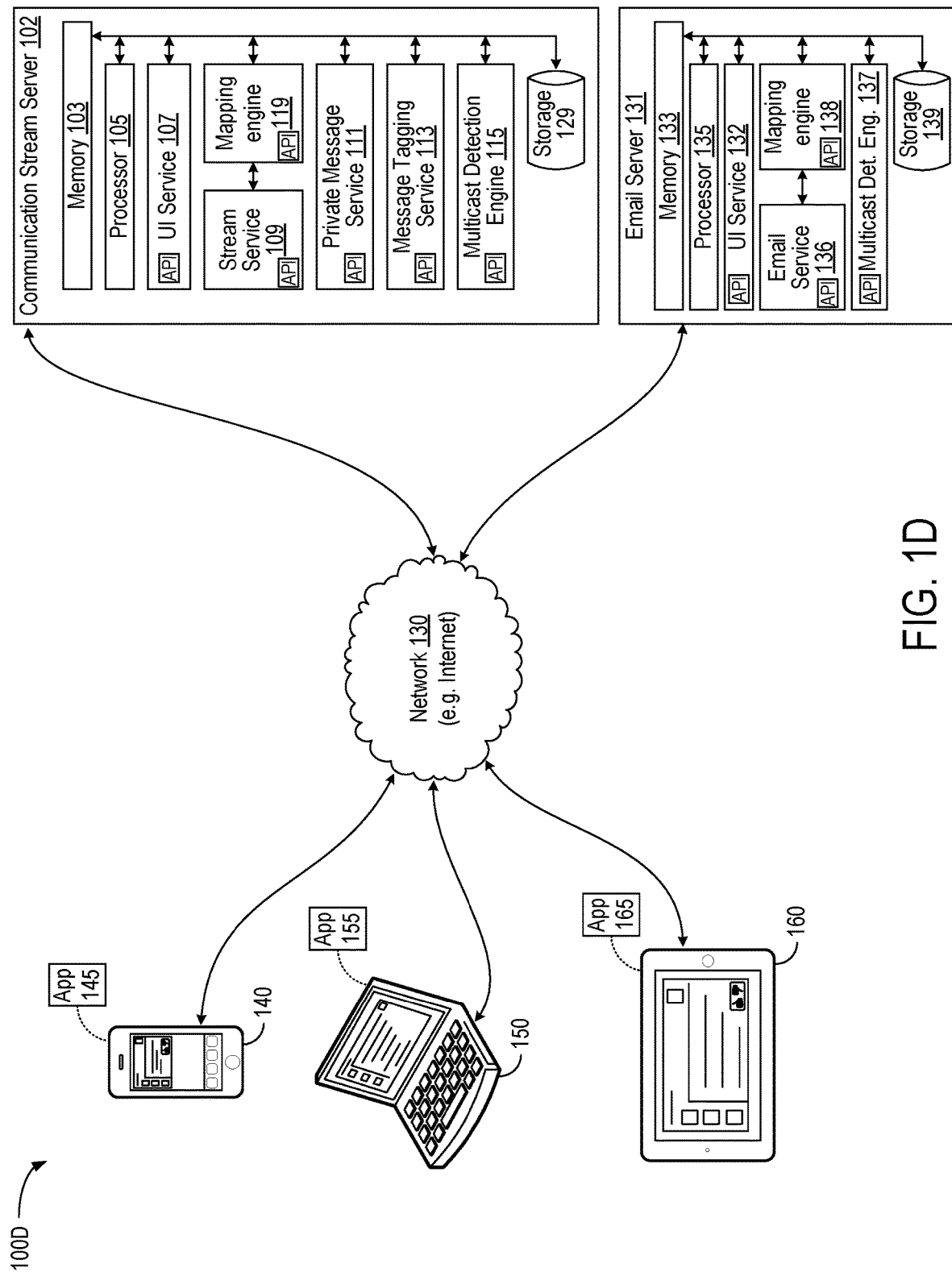
FIG. 1D depicts a computer-implemented system for providing a communication stream for messages in accordance with another embodiment.

FIG. 1D depicts a computer-implemented system 100D for providing a communication stream for messages employing a distributed mapping architecture in accordance with another embodiment. Similar to system 100B of FIG. 1B, System 100D employs a distributed mapping architecture. Here, stream service 109 communicates directly with mapping engine 109, and email service 136 communicates directly with mapping engine 138. This architecture, while distributed, favors speed and performance by virtue of the close-coupling between each mapping engine (119, 138) and its respective service (109, 136).

FIG. 2A depicts an exemplary user interface 200 for viewing communication streams for messages, for a user patriciab@zillium.com, in accordance with one embodiment. FIGS. 2B-2C depict user interface 250 providing a view of email messages in accordance with another embodiment. UI service 107 provides view 205 to a wireless handheld device, e.g., 140, 150, and 160, in accordance with one embodiment, and may tailor the view according to the device and service, e.g., email interface 250 and view 255 depicted in FIGS. 2B-2C, or communication stream interface 200 depicted in FIG. 2A. For example, view 205 depicted in FIG. 2A, or view 255 depicted in FIGS. 2B-2C, may be suitable for a larger device, e.g., devices 150 and 160, whereas a more compact view may be suitable for a smaller device, e.g., device 140. View 205 (255) includes a folder panel 210 (260), a view of email folders. Asserting control 227 (email icon) changes the view from displaying communication stream messages to view 255 (FIGS. 2B-2C) for displaying email messages. Asserting control 229 (stream icon) changes to view 205 to display stream messages. A streams panel 215 displays individual stream messages, here, messages of type task and note. Other message types may also be included without limitation, e.g., comment, and event. Column 217 depicts a series of vertically-arranged icons for selecting one of several (here, six) streams. Panel 220 displays contents of a communication stream message selected in Panel 215. In email interface 250, email message panel 265 displays a list of email messages. Viewing panel (pane) 270 displays contents of an email message 267, shown selected in email message list 265 in FIG. 2B. Viewing pane 270 displays contents of email message 278, shown selected in email message list 265 in FIG. 2C. Returning to FIG. 2A, a communication stream message 218 is a task from Einhard Klein ("Einhard Klein has posted a task") appearing at position no. 5 in panel 215. It is more fully displayed as task 221 in panel 220 ("Send out PR stuff for the new mobile app."). First and second comments relating to task 221 appear below it ("View 2 more comments" 213). Asserting "View 2 more comments" 213 reveals two additional comments relating to Einhard's task 218 in accordance with another embodiment. The "2 more comments" are hidden in view 205 to save space, so that more recent comments, e.g., those depicted in view 205, may be displayed. More or fewer additional comments are displayed in accordance with other embodiments. A private message link 225 appears below second comment 228 ("Einhard Klein: Looks Good"), enabling patriciab@zillium.com to send a private message relating to comment 228 to any user, thereby advantageously enabling "sidebar" conversations relating to Einhard's comment 228. "Send Private Message" link 225 appears when a user hovers a pointer, e.g., mouse, over comment 228 in accordance with one embodiment. In another aspect, "Send Private Message" links are visible in all comments. A mentions link 219 "@Mentions," when activated by a user, here patriciab@zillium.com, transmits a request to UI service 107, which in turn transmits it to stream service 109. Service 109 receives the request, determines which messages in a currently-selected stream, e.g., the stream depicted in panel 215, refer to (mention) the user, e.g., patriciab@zillium.com, and returns to UI service 107, a list of messages in which the user is mentioned. UI service 107 presents a view of the communication stream including the list of messages. In another aspect, UI service 107 prompts the user for a handle, e.g., @patricia, @user001, before transmitting a request to stream service 109. A user may therefore advantageously search a communication stream for mentions of any arbitrary handle or user.

In another aspect, UI service 107 provides a "message details" link in view 205. If view 205 is configured to view communication stream messages (control 229 asserted), activating the link reveals message details pertaining to, e.g., a stream message. The details revealed include information identifying whether the stream message was sourced, or mapped from, an email. Similarly, activating the message details link when view 205 is configured to view email (control 227 asserted) reveals email message details, including information identifying whether the email was sourced, or mapped from, a stream message.

UI service 107 may communicate with a corresponding UI service in a client, e.g., devices 140 (phone), 150 (laptop), and 160 (tablet). UI service 107 delivers a user interface in a web browser and exchanges data via, e.g., Javascript, in accordance with one embodiment. UI service 107 exchanges data with a UI client via, e.g., JSON for mobile devices, while a mobile device-resident application provides a UI relevant to the mobile device in accordance with another embodiment.

In another embodiment, UI 107 receives a form of email address, e.g., user001@zoho.com, from a communication stream interface on, e.g., a web browser or mobile application, and in response, supports and enables on the web browser or mobile device, an email interface including the form of email address pre-populated in a "To:" email address field. In accordance with another embodiment, UI 107 receives a form of stream I.D. or stream handle from an email interface on, e.g., a web browser or mobile application, and in response, transmits to the web browser or mobile device, a communication stream interface including the form of Stream I.D. pre-populated in a stream address field.

Figure 3:
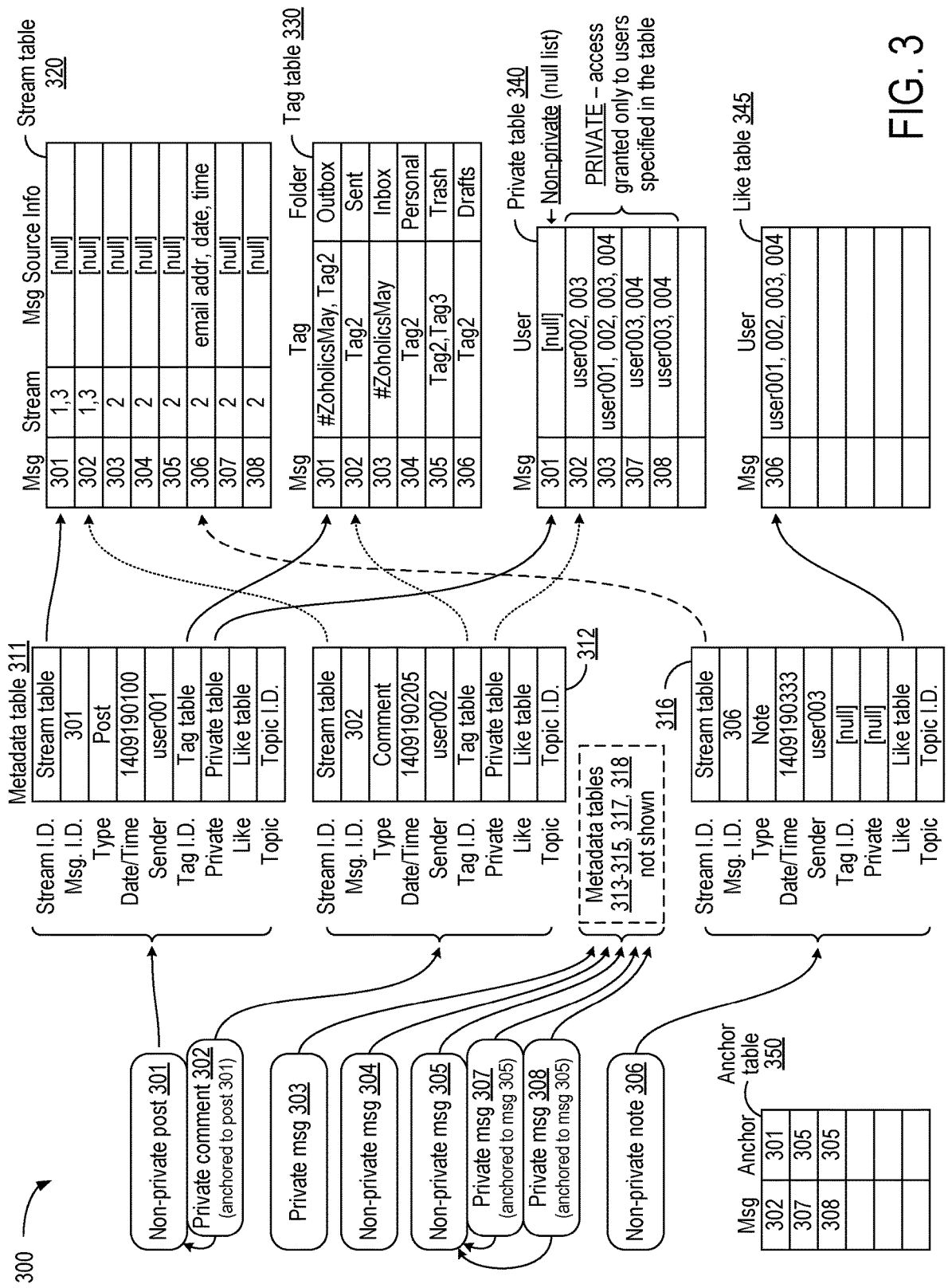
FIG. 3 depicts a data structure for providing a communication stream for messages in accordance with one embodiment.
Figure 4:
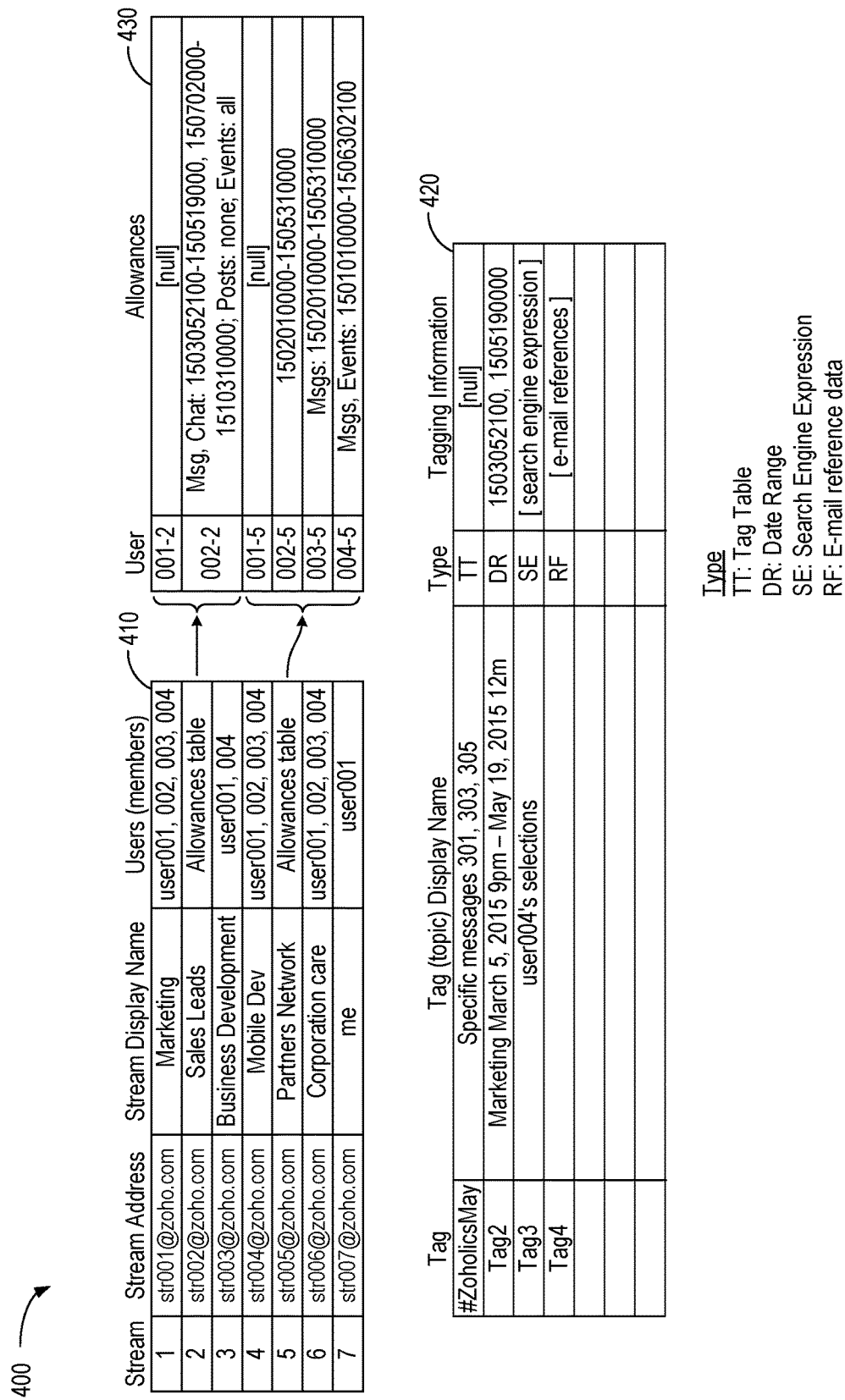
FIG. 4 depicts a data structure for associating users and tags with communication streams in accordance with one embodiment.

FIGS. 3 and 4 depict exemplary data structures 300 and 400 accessed by various services within communication stream server 102, for realizing a computer-implemented method and system for providing a communication stream for messages. Dashed lines are selectively used in FIG. 3 to enhance readability. In a general sense, data structure 300 identifies relationships between messages and streams, and data structure 400 identifies relationships between users and streams. Data structure 300 facilitates associating a message with more than one stream, for example, message 301 depicted in table 320, may have originated in stream 1 (str001@zoho.com), and may have been sent, or forwarded, e.g., to stream 3 at its address, str003@zoho.com. Table 320, row 1, column 2, captures the association ("1, 3") of message 301 to streams 1 and 3. In accordance with another embodiment, sending, or including, messages in more than one stream, is advantageously accomplished by mentioning one or more streams by address or stream I.D. anywhere in the body of a stream message. For example, a user preparing to comment on a post in str001.zoho.com inserts within the comment, references to, e.g., str002@zoho.com, and str004@zoho.com. Upon sending the user's comment within stream 1, it also included (forwarded) to stream 2 (str002@zoho.com), and stream 4 (str004@zoho.com).

Data tables within data structures 300 and 400 are variable length and expandable. Accordingly, a table such as a message stream table 320, depicted for convenience of illustration with 8 rows, may expand to include an arbitrary number of rows. Likewise, column 2 of table 320, depicted identifying two streams ("1,3") associated with message 301, may expand to accommodate a larger list of entries, e.g., "1,3,5,7," as message 301 becomes associated with additional streams, e.g., 5 and 7.

In one aspect, stream service 109 receives a request to create a communication stream. The request arrives from email service 121 or email service 136 in accordance with another embodiment, the email including a return address and commands for creating the communication stream. In another aspect, the request arrives in a non-email message, e.g., via SMS or text message. Command keywords include "create:", "members:", and "name:" in one embodiment. A semicolon ";" delimits commands. For example, stream service 109 receives commands "create: str001@zoho.com; members: user001, user002, user003; name: Marketing," parses the commands, creates str001, joins users001-003 to the stream, and names it "Marketing." If stream service 109 detects erroneous commands, e.g., a keyword "create:" or "members:" are missing or misspelled, it transmits to the return address, a message identifying errors corresponding to the commands. Stream service 109 detects errors in replies it may receive, and repeats (iterates) until it detects an acceptably low number of errors, or receives a termination command. A keyword "body:" is provided in accordance with another embodiment. Text following this keyword is interpreted as body text to a communication stream message.

The request to create a communication stream arrives from UI service 107, mapping engine 119, or multicast detection engine 115 in another aspect. The request specifies users, including at least a first user. For example, stream service 109 receives a request specifying user001. The request includes a stream name, e.g., "Marketing," in one embodiment. The request includes a non-private message in accordance with yet another embodiment. Stream service 109 assigns a stream identifier, "1," enters it in row 1, column 1 of a user stream table 510, enters "Marketing" in stream display name column 2, and enters usr001 in column 3. As depicted in FIGS. 3 and 4, stream identifier "1" is shorthand for a more detailed identifier, e.g., str001@zoho.com, in one embodiment, thereby enabling users of conventional email systems to participate in the stream. Stream service 109 may receive a subsequent request specifying second and third users, e.g., user002 and user003, to communication stream 1. In response, stream service 109 adds user002 and user003 to column 3, row 1 of user stream table 510.

Messages 301-308, also referred to as stream messages, are of various types in one embodiment, including messages, tasks, events, posts, comments, and documents. A message includes a metadata table, e.g., tables 311, 312, and 316 corresponding to messages 301, 302, and 306. For clarity of depiction, metadata tables relating to other messages are not shown in FIG. 3. Stream service 109 receives a non-private message from user001 referencing stream identifier 1, or str001@zoho.com. Stream service 109 adds metadata table 311 to the non-private message, enters a reference, e.g., a pointer, in row 1 to a message stream table 320, assigns and enters message I.D. 301 in row 2, and enters "301" and "1" respectively in row 1, columns 1 and 2 of message stream table 320, thereby associating non-private message 301 with stream 1. Stream service 109 enters the message type, here, "Post," in row 3, enters a timestamp "1409190100" (19 Sep. 2014, 1:00 am) in row 4, and enters "user001" in row 5, thereby identifying user001 as a sender of message 301.

Stream service 109 receives a private message, a comment, from the second user, user002, the private message referencing non-private message 301, the third user, user003, and stream identifier 1. Stream service 109 adds metadata table 312 to the private message, assigns and enters message I.D. 302 in row 2, and enters "302" and "1" respectively in row 2, columns 1 and 2 of message stream table 320, thereby associating message 302 with stream 1. Service 109 enters message type "Comment," timestamp 1409190205, and sender user002 in metadata table 312, and transmits user I.D.s user002, user003, and message I.D. 302, to private message service 111. Service 111 examines private table 340, determines there is no entry for message 302, finds an open row, here, row 2, enters "302" in row 2, column 1, and user I.D.s user002 and user003 in column 2, indicating that only those users may access, e.g., view, message 302. Message 302 is therefore private because access to it is limited, here, to user002 and user003. Private message service 111 returns a reference to row 2 to stream service 109, which enters the reference in row 7 of metadata table 312. Private message service 111 adds message 302 to row 1, column 1 of an anchor table 350 in one embodiment, and adds message 301 to row 1, column 2. By reading anchor table 350, UI service 107 may display message 302 "anchored" to message 301, e.g., by indenting and displaying message 302 below 301. In addition to anchoring private messages, any arbitrary number of messages, whether private or non-private, may be ordered (or "anchored") according to this scheme. By way of example and without limitation, messages 307 and 308 are "anchored" to message 305 as depicted logically in FIG. 3 (arrows emanating from messages 3507 and 308 to message 305). Rows 2 and 3 of anchor table 350 include entries for messages 307 and 308 (column 1), associating them with anchor message 305.

To demonstrate anchoring and viewing of private and non-private messages, UI service 107 receives a request from user003 to view stream 1. In turn, stream service 109 receives a request from UI service 107 including user I.D. user003 and stream I.D. stream 1. Service 109 examines message stream table 320, determines messages 301 and 302 are within stream 1, and examines row 7 of metadata tables 311 and 312 for references to rows of message user table 340 relating to messages 301 and 302, here, rows 1 and 2. Stream service 109 determines row 1, column 2 of table 340 is null, and therefore message 301 is non-private. Service 109 determines row 2, column 2 of table 340 contains user I.D.s user002 and user003, indicating only those users may access message 302. Service 109 transmits message I.Ds 301 and 302 to UI service 107, which provides a representation of the communication stream including non-private message 301 and private message 302, to the third user, user003. UI service 107 consults anchor table 350, determines that message 302 is anchored to message 301, and displays message 302 below and indented relative to 301 in accordance with one embodiment. Similarly, a request received by service 107 from user002 to view stream 1 is handled in the same manner and results in UI service 107 providing a representation of the communication stream, including the non-private message (301) and the private message (302) to the second user, user002. UI service 107 next receives a request from user001 to view stream 1. As described above, stream service 109 determines which messages are available in stream 1, and whether any are private. Because message 302 is accessible by user002 and user003, but not by user001, Service 109 transmits only message I.D. 301 to UI service 107, which provides a representation of the communication stream including non-private message 301, sans (without) private message 302, to user001, the first user.

In another embodiment, private message service 111 manages private table 340, and with reference to metadata tables, determines whether messages identified in private table 340 may be viewed by certain users. More specifically, row 7 of a message metadata table may be null, e.g., as depicted in metadata table 316, or may include a reference to private table 340. A null entry in row 7 indicates message 306 is non-private. A non-null entry in row 7, e.g., it references a row in table 340, indicates the row must be examined. If column 2 of the specified row in table 340 is null, then the message is non-private. If column 2 includes a list of user I.D.s, then the message is private, and may be accessed only by users corresponding to the list of user I.D.s. In one embodiment, stream service 109 consults message stream table 320, collects a list of messages, transmits a request including those messages and a user I.D. to private message service 111, and awaits a return transmission from service 111 indicating which messages are accessible to the user corresponding to the user I.D. In another embodiment, stream service 109 directly inspects table 340 without involving private message service 111. In another embodiment, UI service 107 transmits a user I.D. and a stream I.D. to private message service 111, which in turn examines stream table 320, metadata tables, and private table 340, and returns to UI service 107, a list message I.Ds accessible to the user corresponding to the user I.D.

In another aspect, a topic identifier identifies subject matter relating to a message, and is useful for user display, as a search key, and for mapping or transforming a message to an external or non-native format, e.g., e-mail, or a calendaring system. A topic identifier may also include, for user convenience, text relating to a tag, e.g., #ZoholicsMay. A tag is typically inserted by a user to associate a message with other messages, or as a reference to a group of similarly tagged messages. A Topic I.D. field is provided at row 9 of a metadata table in accordance with one embodiment. For example, stream service 109 receives a request to assign a topic identifier to a message, e.g., message 301, and in response, assigns the topic identifier to the message, e.g., 301, by inserting it into row 9 of metadata table 311.

A tag provides associations among communication stream messages, even if the messages are in different communication streams. Message tagging service 113 accesses message tag table 330, and tag type table 420, which include data relating to tagging and searching messages, to manage communication stream message tags. Message table 330 associates a message with one or more tags. For example, table 330, row 1, indicates that message 301 (column 1) is associated with two tags, "#ZoholicsMay," and "Tag 2." Tag type table 420 associates a tag with a display name, a tag type, and optional tagging data, e.g., types "TT," "DR," "SE," and "RF" that may be used in searching for messages. Any tag type and related data may appear in any row of table 420. By way of example and without limitation, row 2 indicates "Tag2" (column 1) is of tag type "DR" (column 3) and optional DR (date range) tagging data ("1503052100, 1505190000") are in column 4. In response to a request for messages relating to "Tag 2," message tagging service 113 searches tag type table 420, locates "Tag 2" in row 2, determines that Tag2 is of type "DR" and searches messages fitting date range criteria specified in column 4. Message tagging service 113 "searches messages" by examining row 4 of metadata tables (Date/Time), building a list of message I.D.s with timestamps between Mar. 3, 2015, 9:00 pm and May 19, 2015, 12:00 am, as specified in row 2, column 4 of tag type table 420. In another example, row 1 of tag type table 420 indicates tag "#ZoholicsMay" is of tag type "TT." Accordingly, Message tagging service 113 searches tag table 330 for messages matching the tag itself, here, "#ZoholicsMay." A search engine expression (type "SE") is provided in column 4, enabling arbitrarily complex criteria for retrieving messages relating to tag 3. A list of email references (type "RF") is provided in column 4 to preserve links in a conventional email thread, thereby enhancing mapping and transforming between conventional email and a communication stream.

By way of example and without limitation, messages 301 and 303, associated respectively with streams 1 and 3, and are also associated with a Tag I.D., e.g., "#ZoholicsMay." A user wishing to retrieve messages relating to #ZoholicsMay sends a request including this term to UI Service 107. Message tag service receives the request, searches message tag table 330 to obtain a list of messages tagged with #ZoholicsMay, here, 301 and 303, and as explained above with respect to messages within a stream, examines whether a user has access to each message, and returns a list of tagged messages, e.g., 301, 303, to UI services 107 to which the user has access. A tag may be added by an automated process, e.g., by multicast detection engine 115 or mapping engine 119, either separately or in cooperation with message tagging service 113, or by a user requesting a tag via UI service 107.

In another aspect, one or more communication stream messages may be "liked" by a user, indicating, e.g., a positive "vote" relating to a comment or message. Row 8 of message metadata tables may include a reference to a "like" table, e.g., table 345. Table 345 associates a message with one or more users who have expressed a "like" relating to the message. For example, row 8 of message metadata table 316 (corresponding to message 306) refers to row 1 of like table 345. Column 2 of this table lists users001-004, indicating these users "like" message 306. When providing a view of a communication stream including message 306, UI service 107 reads like table 345 and displays, e.g., a count of users liking message 306. An exemplary view of a communication stream provided by UI service 107, including a message indicating one (1) "like" 223, is depicted in FIG. 2A.

Figure 5:
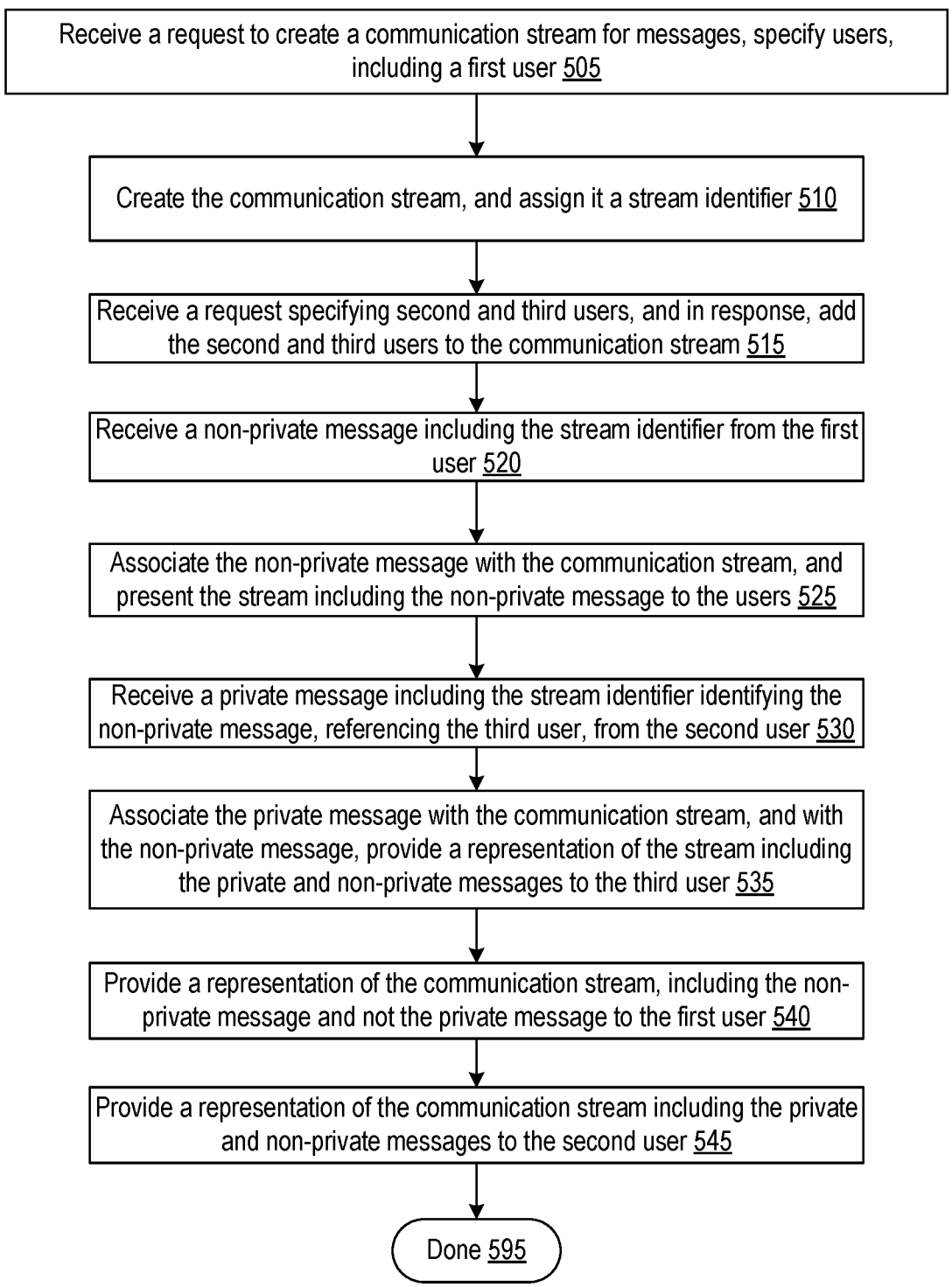
FIG. 5 is a flow chart depicting a method of creating a communication stream in one embodiment.

FIG. 5 is a flow chart 500 depicting a method of creating a communication stream in one embodiment. In step 505, the method receives a request to create a communication stream for messages. The request specifies users, including a first user, e.g., user001. The method next creates the communication stream at step 510, and assigns it a stream identifier, e.g., "1", or str001@zoho.com. At step 515, the method receives one or more requests specifying second and third users, e.g., user002 and user003, and in response adds the second and third users to the communication stream. At step 520, the method receives a non-private message including the stream identifier from the first user, and in step 525, associates the non-private message with the communication stream. The method presents the communication stream, including the non-private message, to the users. At step 530, the method receives a private message identifying the non-private message from the second user, including the stream identifier, and referencing the third user. The method associates the private message with the communication stream in step 535, and provides a representation of the stream including the private and non-private messages, to the third user. At step 540, the method provides a representation of the communication stream, including the non-private message and not (sans) the private message, to the first user. The method next, at step 545, provides a representation of the communication stream including the private and non-private messages to the second user. At step 595, the method is done.

Figure 6:
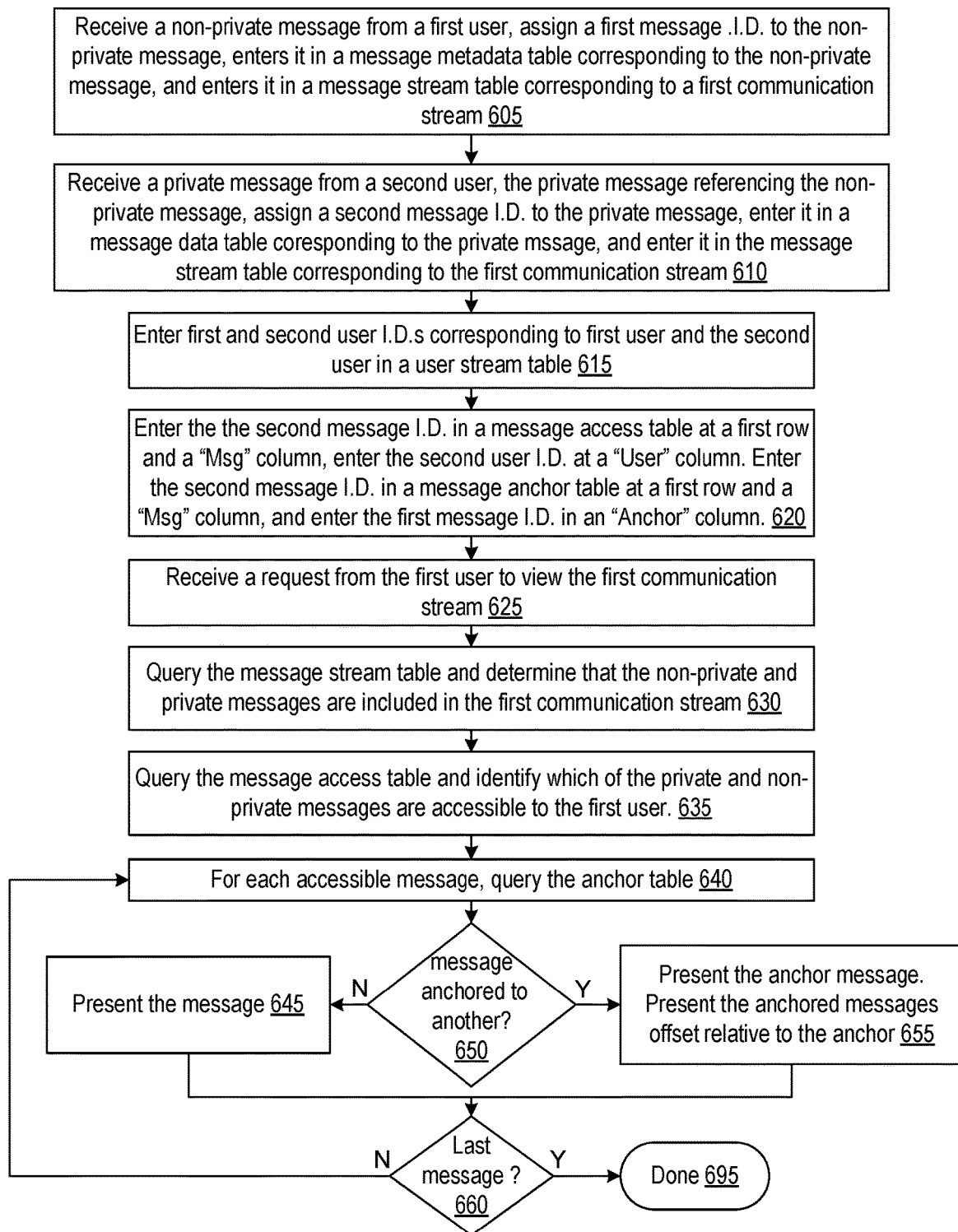
FIG. 6 is a flow chart depicting a method of creating and displaying a private message for a communication stream in accordance with one embodiment.

FIG. 6 is a flow chart 600 depicting a method of creating and displaying a private message for a communication stream in accordance with one embodiment. At step 605, the method receives a non-private message from a first user and assigns a first message I.D. to the private message. The method enters the first message I.D. in a message metadata table corresponding to the first message, e.g., at row 2 of metadata table 311 corresponding to message 301, and enters the message I.D. in a message stream table, e.g., message stream table 320, at row 1, column 1, and enters a stream I.D. at row 1, column 2, corresponding to the first communication stream, e.g., stream 1. The method at step 610 receives a private message from a second user, the private message referencing the non-private message. The method assigns a second message I.D. to the private message, enters the second message I.D. in a metadata table corresponding to the second message, and enters the message I.D. in the message stream table corresponding to the first communication stream. At step 615, the method enters first and second user I.D.s corresponding to the first and second user in a user stream table, e.g., table 410. The method next, at step 620, enters the second message I.D. corresponding to the private message, and the second user I.D., in an access restriction table, e.g., private table 340, respectively in "Msg" and "User" columns. The method also enters the second and first message I.D.s respectively in "Msg" and "Anchor" columns of a message anchor table, e.g., message anchor table 350.

In step 625, the method receives a request from the first user to view the first communication stream. The method queries the message stream table in step 630, e.g., message stream table 320, and determines that the non-private and private messages are included in the first communication stream. The private table is next queried in step 635, and the method determines which of the private and non-private messages are accessible to the first user. At step 640, for each message accessible to the first user, the method queries the anchor table, e.g., table 350, to determine whether the message is anchored to another. If "yes" at step 650, the method presents the anchor message (the message to which other messages are "anchored") at step 655, and presents messages anchored to the anchor message. The anchored messages are presented offset and below the anchor message in one embodiment. If "no" at step 650, then at step 645, the method simply presents the message. At step 660, the method determines whether the last message has been presented. If "no," the method returns to step 640 and repeats steps 640-660 until the last message has been presented. If "yes," the method is done at step 695.

Figure 7A:
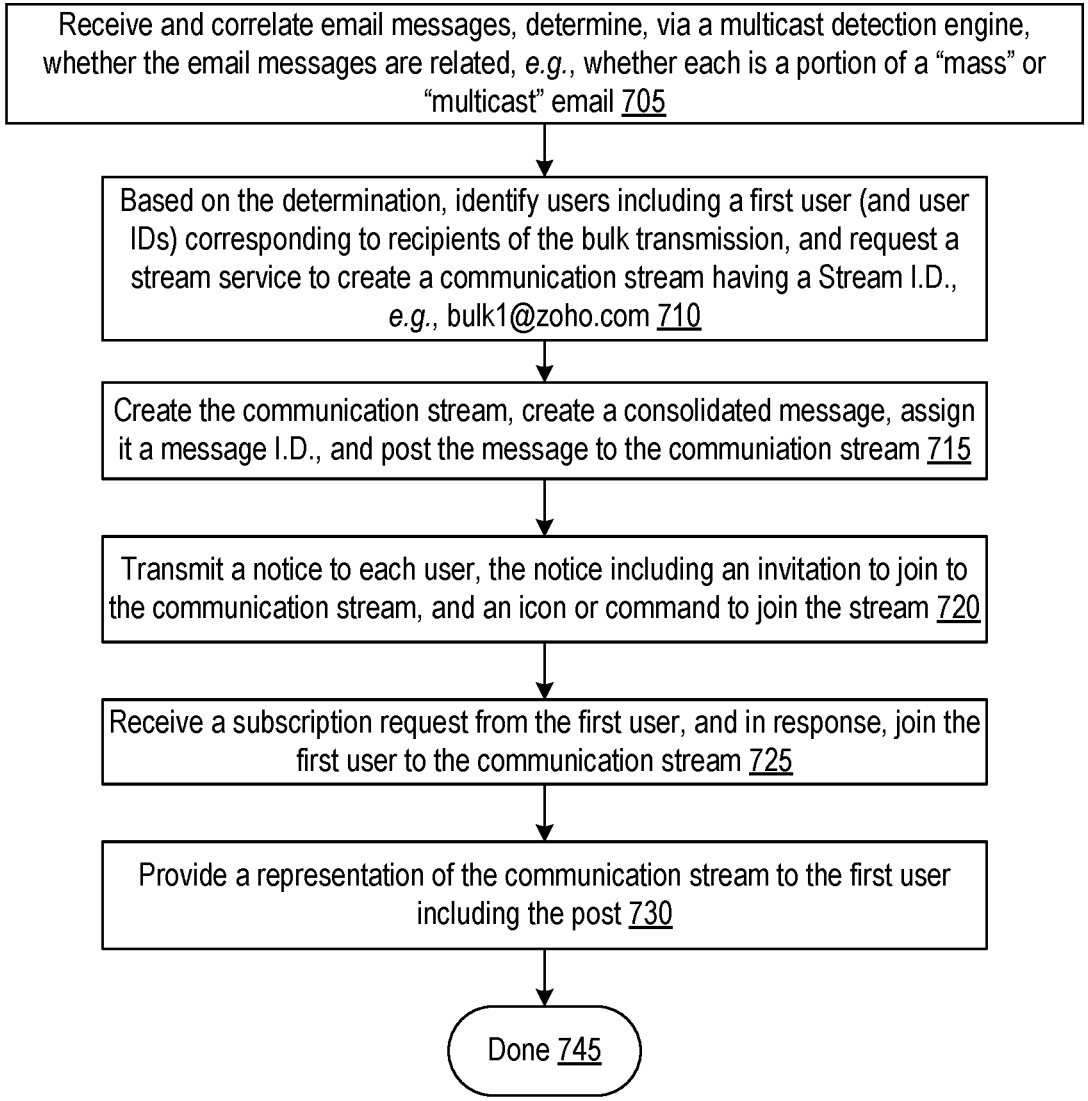
FIG. 7A is a flow chart depicting a method of detecting a mass email and creating a communication stream in accordance with one embodiment.

FIG. 7A is a flow chart 700 depicting a method of detecting a mass email and creating a communication stream in accordance with one embodiment. In step 705, the method receives one or more email messages, e.g., via multicast detection engine 115. The method compares messages to one another, and based on similarity scoring or correlating messages, determines whether the email messages are related, e.g., that each message may be a portion of a "mass" or "multicast" or "bulk" email. Such an approach is useful for detecting email such as newsletters, and advertisements. A bulk transmission may be formatted as a unicast message to multiple recipients in a single domain (e.g., zoho.com), each message including a personalized greeting, or it may be a multicast message, e.g., a single message directed to a distribution group (mailing list). Bulk transmissions include, e.g., newsletters, ads, and solicitations involving coupon offers. A multicast detection engine, e.g., engine 115, identifies bulk transmissions by analyzing incoming email headers for similarities, e.g., source IP address, in accordance with one embodiment. In another aspect, the multicast detection engine detects and compares message text, e.g., by pattern detection, and heuristically-based lexicographical analysis. Specific triggering criteria, e.g., a specific source IP address, and message count, e.g., 50 or 100 messages, are employed in accordance with one embodiment. Upon detection of a bulk transmission, the multicast detection engine identifies recipients of the bulk transmission as such, maintaining a corresponding list of user I.D.s, and initiating creation of a communication stream. In step 710, based on the determination made in step 705, the method identifies users, including a first user (and user IDs) corresponding to recipients relating to the bulk transmission, and requests a stream service, e.g., 109, to create a communication stream and assign it a stream I.D., e.g., bulk1@zoho.com. At step 715, the method creates the communication stream via the stream service, creates a consolidated message, e.g., a post to the communication stream based on the email messages, assigns it a message I.D. At step 720, the method transmits a notice to each user, the notice including an invitation to join the communication stream, and provides an icon or command to join the communication stream. The method at step 725 receives a subscription request from the first user, and in response to the request, joins the first user to the communication stream. As explained above, joining a communication stream may be accomplished by adding a user I.D. to various data tables in data structures 300 and 400. Returning to step 730, the method provides a representation of the communication stream to the first user, including consolidated message, here, a post. At step 745, the method is done.

Figure 7B:
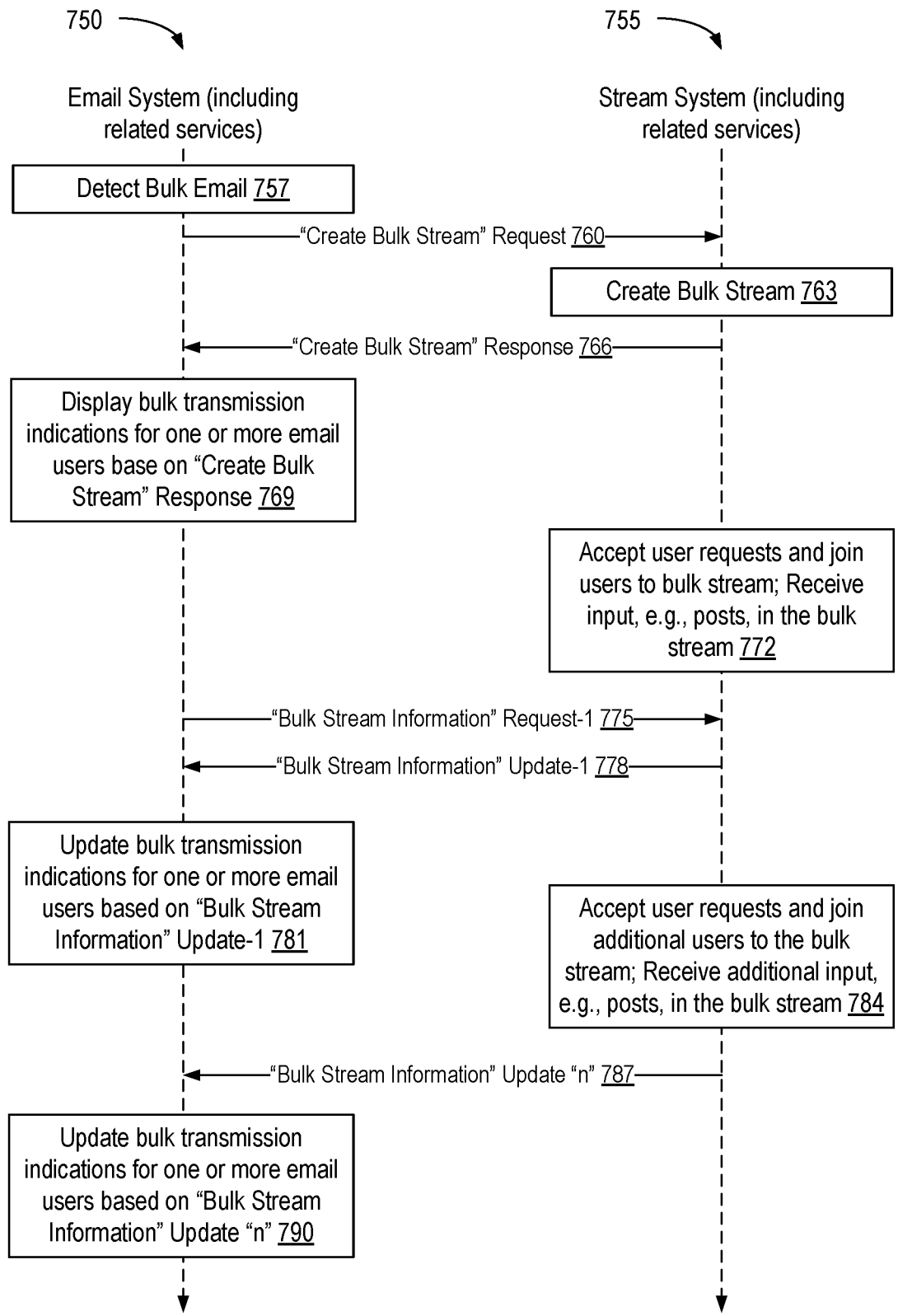
FIG. 7B depicts a flow diagram illustrating communication between an email system and a communication stream system in accordance with one embodiment.

FIG. 7B depicts a flow diagram illustrating communication between an email system 750 and a stream system 755, supporting bulk email transmission and related features. For clarity of illustration only and without limitation, the communication flows depicted in FIG. 7B appear to occur in a regular, apparently synchronous, ordered pattern between email system 750 and stream system 755. Communication flows are not necessarily regular, synchronous, or ordered, however, and may occur asynchronously and without any particular regularity or order. Exemplary email and stream systems 750 and 755 are depicted in FIGS. 1A-1D. Depending on configuration, systems 750 and 755 may include one or more services and engines, e.g., multicast detection engines 115 and 137, mapping engines 119, 117, and 138, stream and email services 109 and 136. Email system 750 detects 757 a bulk email transmission, and communicates a "Create Bulk Stream" request 760 to stream system 755. Request 760 includes information for stream system 755 to use in creating a bulk stream corresponding to the bulk email detected by email system 750. Stream system 755 responds by communicating to email system 750 a "Create Bulk Stream" response 766. Based on information contained in response 766, email system 755 displays bulk transmission indications 769, e.g., as described and depicted with respect to FIGS. 2A-2C, to recipients of the bulk email. Stream system 755 accepts 772 requests from users to join the new bulk stream, joins the users to the bulk stream, and receives input, e.g., posts and other stream items, from one or more of those users for the bulk stream. Email system 750 may poll stream system 755 for updated bulk stream information via a "Bulk Stream Information" Request-1 775. Stream system 750 responds with a "Bulk Stream Information" Update-1 778, including new bulk stream information and content, e.g., new since response 766. Email system 750 updates 781 bulk transmission indications for one or more email users based on Update-1 778. Stream system 755 accepts 784 requests from more users to join the bulk stream, e.g., users responding to Update-1 778, joins the users to the bulk stream, and receives input from one or more of them, e.g., posts and other stream items. Stream system 755 pushes a "Bulk Stream Information" Update "n" 787 to email server 750 in accordance with another embodiment. Stream system 755 may push update 787 whenever it updates the bulk stream, or at certain intervals. "Pushing" and "polling" may be used as desired to effectuate updates between systems. In response to and based on information included in Update "n" 787, email system 750 updates 790 bulk transmission indications for current and any additional email users.

Figure 8:
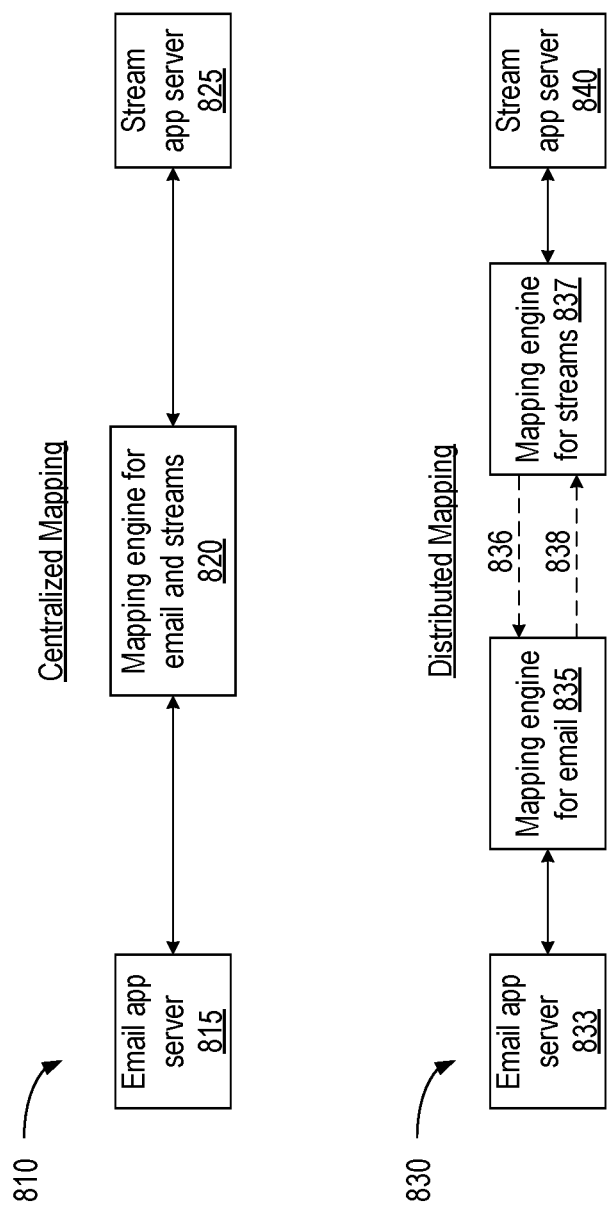
FIG. 8 depicts various configurations for mapping between streams and other services.

FIG. 8 depicts centralized and distributed mapping configurations for sharing communication stream messages with other services, e.g., email, and chat. A mapping engine may be driven by rules, e.g., as described in mapping tables 1000, algorithmically, or in any combination. Centralized mapping is simple architecturally, and allows a plurality of services to share and leverage a central mapping engine. In central mapping configuration 810, a mapping engine 820 is disposed centrally among servers, here, between email app server 815 and (communication) stream app server 825. Other examples of centralized mapping are depicted in FIG. 1A (engine 119, server-embedded), FIG. 1C (engine 117, standalone, network-disposed), and FIG. 9 (engines 928, 948, and 958).

In distributed mapping, a plurality of mapping engines serve a plurality of services. One or more mapping engines may be embedded in one or more servers along with other services, may be disposed as standalone entities, or be disposed in any combination. In distributed mapping configuration 830, mapping engine 835 provides mapping services for email app server 833, and mapping engine 837 provides mapping services for (communication) stream app server 840. Mapping engine for streams 837 transforms, e.g., algorithmically or based on rules 1000 communication stream messages in stream app server 840, and exports the transformed messages via path 836, a generalized communication path involving data and control, to mapping engine for email 835 in accordance with one embodiment. Mapping engine for email 835 provides additional transformation, if needed for email app server 833, and forwards the message to server 833. Similarly, a message originating in email server 833 may be transformed by mapping engine for email 835, e.g., algorithmically or based on rules 1000, and transmitted to mapping engine for streams 837 via path 838 (a generalized communication path involving data and control), further transformed if needed, and forwarded to stream app server 840. Communication between mapping engines 835 and 837 is accomplished via APIs, in which each engine polls the other, e.g., periodically to obtain data changes in accordance with one embodiment. Communication between engines 835 and 837 is accomplished via "webhook," in which each pushes data to the other and vice-versa via, e.g., a callback or interrupt-driven mechanism in accordance with another embodiment. When an update, change, or event occurs in a mapping engine, the engine provides via a webhook to another engine, e.g., delivered at a URL, one or more triggers, data, or changes to data, and information related to events or data changes. Other examples of distributed mapping are depicted in FIGS. 1B and 1D (server-embedded engines 119, 138), and FIG. 9 (client-based engine 938).

Figure 9:
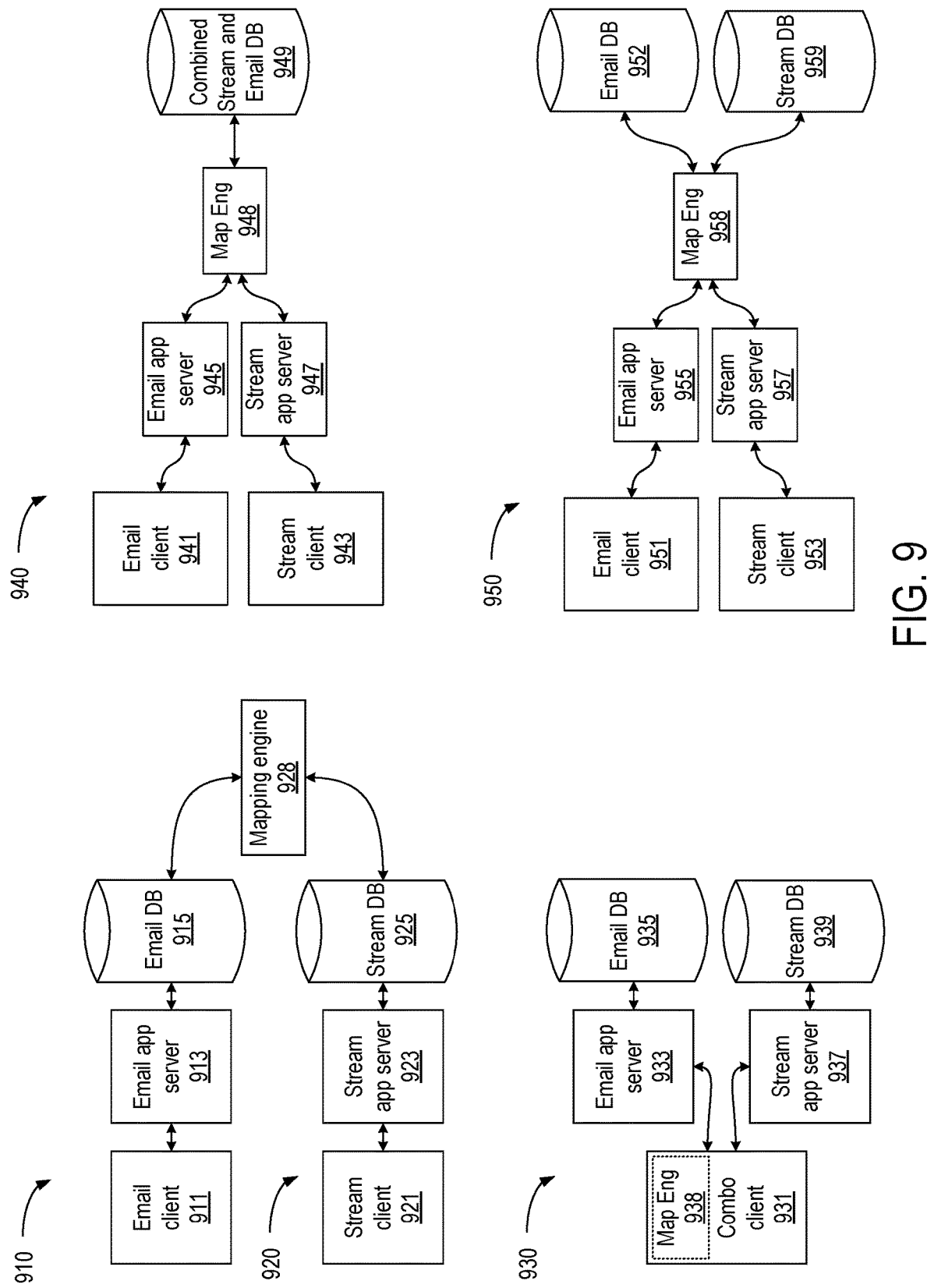
FIG. 9 depicts various configurations of servers and clients for communication streams and electronic mail (e-mail), and for mapping between communication stream and e-mail messages in accordance with various embodiments.

FIG. 9 depicts exemplary configurations 910, 920, 930, 940, and 950, of servers and clients for communication streams and electronic mail (e-mail), and for mapping between e-mail and communication stream messages. A communication stream advantageously provides a consolidated view of various message types, organized primarily by stream, and may be recalled and searched in numerous other ways including, e.g., by tag, topic identifier, date ranges, and general search queries. In some circumstances, e.g., voluminous historical e-mail data is contained within a legacy system, or a client has no access to a communication stream server, it is advantageous to provide a consolidated view of a communication stream and email data in a single client environment. References to stream and email databases (DB) are used for descriptive clarity and are not meant to limit the scope of the disclosure or claims, and may be interpreted broadly to be synonymous with servers and systems, whether spatially or logically distributed or not, in which such databases may exist.

In one embodiment, mapping and transforming of messages occurs between systems. A conventional email system 910 includes a conventional email client 911 in communication with a conventional email app server 913 and email DB (database) 915. A communication stream system 920 includes a stream client 921 in communication with a stream app server 923 and stream DB (database) 925. A mapping engine 928, in cooperation with webhooks and APIs provided by various services, e.g., services 107, 109, 111, 113, and 115, and data structure 1000 (depicted in FIG. 10) serve to transform messages between email system 910 and communication stream system 920. A message that resides in one system may therefore be mapped or transformed, and stored and viewed in the other system. A client maps and transforms messages originating in separate systems in another embodiment.

In configuration 930, a combo client 931 and a mapping engine 938 reside in a client device, e.g., wireless handheld device 140, and view messages in combo client 931 originating in email DB 935 and Stream DB 939. Mapping engine 938, in communication with email app server 933 and email DB 935, transforms and maps email messages to a format suitable for storing in communication stream DB 939, and viewing in combo client 931. Mapping engine 938 cooperates with services in a communication stream server, e.g., server 102 via webhooks and APIs, and data structure 1000, to effectuate message mappings and transformations, which may be bi-directional, e.g., email-to-stream DB, and stream-to-email DB. When disposed in a combo client, e.g., 931, mapping engine 938, occurring in many instances of combo client 931, is in a distributed configuration. Although depicted in combo client 931, mapping engine 938 may also be disposed in either server 933 or 937, or may be separately disposed as a standalone service.

In another embodiment, configuration 940 relies on mapping engine 948 to map and transform messages (as described above) residing in a combined stream and email DB 949, to a conventional email client 941 communicating with email app server 945, and to a stream client 943, communicating with stream app server 947. Configuration 950 relies on mapping engine 958 to map and transform messages (as described above) residing in separate email (952) and stream (959) DBs. Conventional email client 951 communicates with email app server 955, and stream client 953, communicates with stream app server 957.

Figure 10:
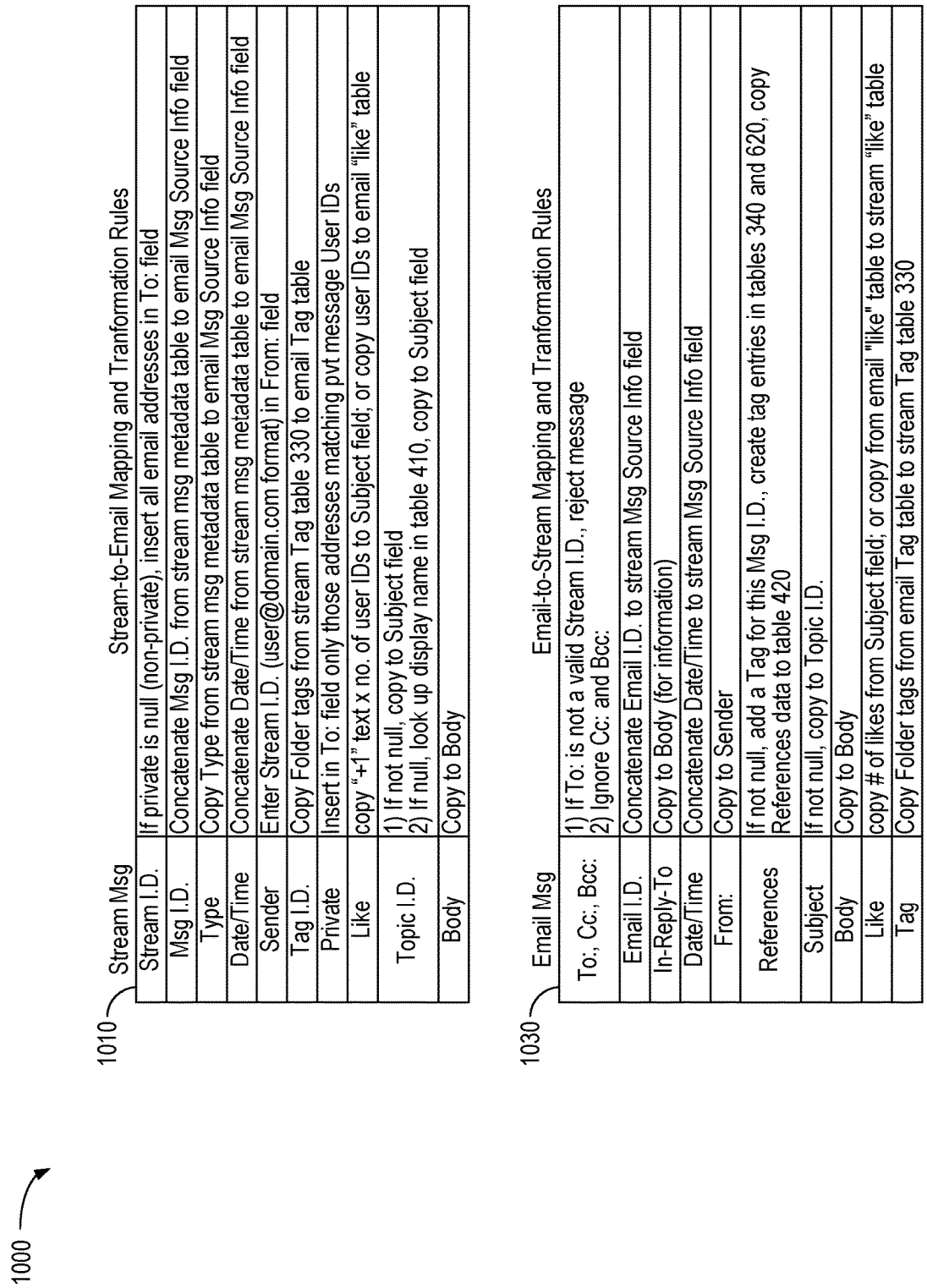
FIG. 10 depicts a data structure for mapping between email and communication stream messages in accordance with another embodiment.

FIG. 10 depicts data structure 1000 in support of methods for mapping and transforming email messages and communication stream messages in accordance with one embodiment. The methods support exporting one or more messages to a third party application, including an email application. The methods also support responding to a request to transmit a message to an email address, and enabling transmitting the message to the email address. The methods also support importing one or more third party messages from a third party application, including third party email messages from an email application. Table 1010 comprises rules for transforming or mapping a communication stream message to a conventional email message. A mapping or transformation may be triggered when a mapping engine, e.g, mapping engine 119, receives a message from a server in accordance with one embodiment. Transformation is triggered upon receipt by the mapping engine of an express transformation request from a client, e.g., web browser or mobile application in accordance with another embodiment. A UI service, e.g., UI service 107 may, in another embodiment, receive a request to forward a communication stream message to an email server, and vice versa, thereby implicitly triggering a mapping or transformation. Mapping and transformation is initiated on a batch basis in an administrative context, e.g., to convert legacy email database contents to a communication stream database in accordance with yet another embodiment. If a message to be transformed or mapped includes an external recipient—one outside of a domain associated with an organization served by a communication stream server—the mapping engine, e.g., 119, requests stream service 109 to create a user account and profile for the external recipient, e.g., recipient@notzoho.com. The user account and profile for the external account is used by the system for communication streams and is inaccessible to the external recipient. Email-to-stream (and vice-versa) message mappings advantageously find utility in circumstances in which: (1) a messaging service supports only one type of messaging (stream or email), but not both; (2) a client device supports only one type of messaging (stream or email), but not both; (3) a user elects to receive only one type of message (stream or email), but not both; and (4) an email-only user exchanges messages with a stream-only user, and vice-versa.

The following description applies to mapping and transforming communication stream messages to email messages. Column 1 of table 1010 includes elements of communication stream message metadata, e.g., metadata table 311. Column 2 of table 1010 includes rules that are executed by a mapping engine, e.g., 119 to effectuate a mapping or transformation. For purposes of illustration, mapping engine 119 processes the rules in table-ascending order. More generally, it may do so in any order. Mapping engine 119 refers to data structures 300 and 400, and relies on other services, e.g., stream service 109, private message service 111, and email services 121 and 137, including their respective referencing of data structures 300 and 400 and operations (as described above) to effectuate rule processing.

To map or transform a communication stream message 302 to an email message, a mapping engine, e.g., mapping engine 119 or 117, or UI service 107, receives a request to forward communication stream message 302 to several email addresses. It transmits the request to mapping engine 119, or another mapping engine, e.g., mapping engine 117, or 138, which executes the rule corresponding to row 1 (Stream I.D.) of table 1010. For clarity of discussion, only mapping engine 119 is described. Any mapping engine, e.g., 117 and 138, may be employed within the scope of the invention. It reads a private table reference in row 7 of metadata table 312 (corresponding to message 302), follows it to row 2 of table 340, and determines that message 302 is private because user002 and user003 are included in row 2 of table 340, indicting they are the only users allowed access to message 302, determines that neither user002 nor user003 is among the several email addresses, and stops. If private table 340 at row 2 (corresponding to message 302) includes an external address, e.g., extuser@notzoho.com (not shown), and if extuser@notzoho.com is among the forwarding email addresses, then mapping engine 119 determines to forward the mapped/transformed message 302 to the external address, further associating message 302 with a "Sent" email folder based on the "Sent" tag it reads from tag table 330, row 2, column 2 ("Folder"). Message 303 is similarly processed, and assuming it too has an external address, is mapped and directed to an external user's "Inbox" folder. Mapping and transforming of messages therefore advantageously retains message relationships. Here, the private message that user002 sent to user003 in the communication stream system is reflected, after mapping, in those users' respective email accounts as "Sent" for user002, and "Inbox" for user003. This is particularly useful when, e.g., mapping and transforming messages in bulk, for example initiated by an administrator, from a legacy email system to a communication stream system.

Mapping engine 119 transforms communication stream message 301 in accordance with another embodiment. A mapping engine, e.g., mapping engine 119, 117, or 138, or UI service 107, receives a request to forward communication stream message 301 to several email addresses. It transmits the request to mapping engine 119, which executes the rule in row 1 of table 1010, reads a private table reference in row 7 of metadata table 311 (corresponding to message 301), follows the reference to row 1 of table 340, and determines the entry is null. The message is therefore non-private. Mapping engine 119 prepares a draft email message and copies the several email address into the "To:" field of the draft email. Rules corresponding to rows 2-4 (Msg. I.D., Type, Date/Time) in table 1010 direct mapping engine 119 to concatenate information from corresponding fields in metadata table 311 and copy the information to a "Msg Source Info" field (analogous to the Msg Source Info field in stream table 320) corresponding to the email. Asserting a "Message Details" link in an email window while viewing the email produced by mapping engine 119 displays this information to a user in accordance with one embodiment. In another aspect, row 5 of table 1010 indicates mapping engine 119 is to enter the Stream I.D. in user@domain.com format in the "From:" field of the draft email. Row 6 (Tag I.D.) directs mapping engine 119 to copy Folder tags, e.g., Inbox, Sent, Outbox, from table 330 corresponding to the stream message, to a corresponding Tag folder table in the email system database. Emails that have been mapped and transformed from communication stream messages thereby automatically appear in the same relative folders, e.g., Inbox, Sent, as their pre-transformation stream counterparts when displayed by UI service 107 in an email window. Row 7 (Private) relates to user addressing of private messages and was discussed above in connection with user addressing and processing of Row 1. Row 8 of table 1010 includes a rule relating to copying "Likes" from a communication stream message to an email. Mapping engine 119 reads, and if not null follows, a reference in row 8 of metadata table 311 to like table 345. In this example relating to message 301, row 8 of metadata table 311 is blank, so mapping engine 119 takes no action. Had row 8 referred to, e.g., table 345 row 1, mapping engine 119 would have counted four users (users001-004), and would have copied a string to the Subject: field of the draft email, e.g., "4 likes," or "+1×4." The destination email server database includes a metadata table (similar to stream metadata tables, e.g., 311) in one embodiment, corresponding to each email message, including a field corresponding to "likes." Mapping engine 119 copies the user IDs from (stream) table 345 to the email "like" table corresponding to the email being created. An email client, when displaying the converted email, displays the user ID for each like in accordance with one embodiment similar to "likes" displayed in a stream client. Mapping engine 119 reads row 9 (Topic Identifier) of metadata table 301, determines that it is null. Had the field not been null, mapping engine 119 would have copied the Topic Identifier to the Subject: field of the draft email. Because the field is null, mapping engine 119 reads row 1 of table 410 (corresponding to Stream I.D. 1) and enters the display name from column 2 in the Subject: field of the draft email. Finally row 10 instructs mapping engine 119 to copy the body of communication stream message 301 to the body of the draft email. The transformation is complete, and mapping engine 119 submits the draft email to service 121 along with a request for it to transmit the draft email to an email address, here, the one or more email addresses in the "To:" field of the draft email. Responsive to the request, email service 121 transmits the email message. Mapping engine submits the draft email to service 136 in accordance with another embodiment. Mapping engine 938 performs the steps outlined above on a client device in accordance with another embodiment.

The following description applies to mapping and transforming email messages to communication stream messages. Mapping engine 119 receives an email message from mail service 121 in accordance with one embodiment. Table 1030 comprises rules executed by mapping engine 119 for transforming a conventional email message to a communication stream message. To map and transform email to stream messages, mapping engine 119 relies on data structures and services similar to those identified above with respect to mapping stream messages to email. At row 1 of table 1030, mapping engine 119 examines the "To:" field of the email and determines whether it identifies a communication stream, e.g., str001@zoho.com, or a user, e.g., user001@zoho.com. If so, the mapping engine proceeds; if not, it stops. Cc: (carbon copy) and Bcc: (blind carbon copy) fields of the email are ignored. If mapping engine 119 determines the "To:" field of the email does not identify a communication stream, it initiates creating a new communication stream corresponding to the "To:" field. In accordance with another embodiment, if the "To:" field includes a valid stream I.D., e.g., user001@zoho.com, and a corresponding email user, e.g., user001, has opted to view email as stream messages, then a corresponding Stream inbox (and potentially, e.g., other personal folders) will exist. In that case, Cc: and Bcc: will undergo a validity analysis as performed on the "To:" above, and included or ignored according to the validity analysis. Mapping engine 119 initiates communication with the stream server to create user accounts corresponding to addresses it identifies in the "From:" "Cc:" and "Bcc:" fields. For an address corresponding to an external user, e.g., external@notzoho.com, the newly created user account facilitates sending and receiving messages to the external user, but the account itself is inaccessible to the external user. Once mapping engine 119 determines the email includes a valid address to a communication stream, it prepares a draft communication stream message, including a draft metadata table, and enters the stream I.D. in row 1 of the draft metadata table. Rules corresponding to rows 2 and 4 (Email I.D., Date/Time) direct mapping engine 119 to concatenate information from corresponding fields a email metadata table corresponding to the email being transformed, and copy the information to the "Msg Source Info" in stream table 320 corresponding to the stream message. Activating a "Message Details" link while viewing a stream message, e.g., in view 205, or a stream-only interface, reveals the "Msg Source Info" in table 320, which includes information identifying the message originated as, i.e., its source is, an email message. Row 3 instructs mapping engine 119 to copy the "In-Reply-To" field of the email to the body of the draft communication stream message. This data is included for user convenience. Row 4 (Date/Time) is null, so mapping engine 119 takes no action. Stream service 109 will automatically timestamp the message after receiving it and the draft metadata table from mapping engine 119. Responsive to the instruction at row 5, mapping engine 119 copies the "From:" field in the email to row 5 ("Sender") of the draft metadata table. Row 6 relates to processing of a "References:" header in a conventional email message. If this field is present in the email, mapping engine 119 creates a draft tag table in the format of table 420, enter "RF" in column 3 (type), and copies the data from the "References:" header in the email to column 4 of the draft tag table. Mapping engine 119 adds display text to column 2 of the temporary tag table, e.g., "References imported," in accordance with another embodiment. At row 7 of table 1030, if the Subject field of the email is not null, mapping engine 119 copies it to row 9 (Topic I.D.) of the draft metadata table. Finally, row 8 instructs the mapping engine to copy the body of the email to the body of the draft communication stream message. Row 10 (Tag) directs mapping engine 119 to copy Folder tags, e.g., Inbox, Sent, Outbox, from the tag table corresponding to the email message, to tag table 330 in the communication stream database corresponding to the stream message. Stream messages that have been mapped and transformed from email messages thereby automatically appear in the same relative folders, e.g., Inbox, Sent, as their pre-transformation email counterparts when displayed by UI service 107 in a stream view window, e.g., view 205. The transformation is complete, and mapping engine 119 submits the draft communication message, the draft metadata table, and if one exists, the draft tag table, to stream service 109. Stream service 109 creates a new stream message, including a new metadata table, and respectively copies the contents from draft tables to the new tables. As in creating a new message (explained above with respect to FIGS. 3 and 4), stream service 109 appropriately creates Msg. I.D. and other data relating to the new message. If a draft tag table exists, stream service further creates a Tag I.D. and inserts it in row 6 of the new metadata table, adds entries in tag tables 3530 and 420, and copies data from the temporary tag table to corresponding locations in table 420. Once the new message has been created, stream service 109 deletes the draft message and tables created by mapping engine 119. Mapping engine 938 performs the steps outlined above on a client device in accordance with another embodiment.

Figure 11:
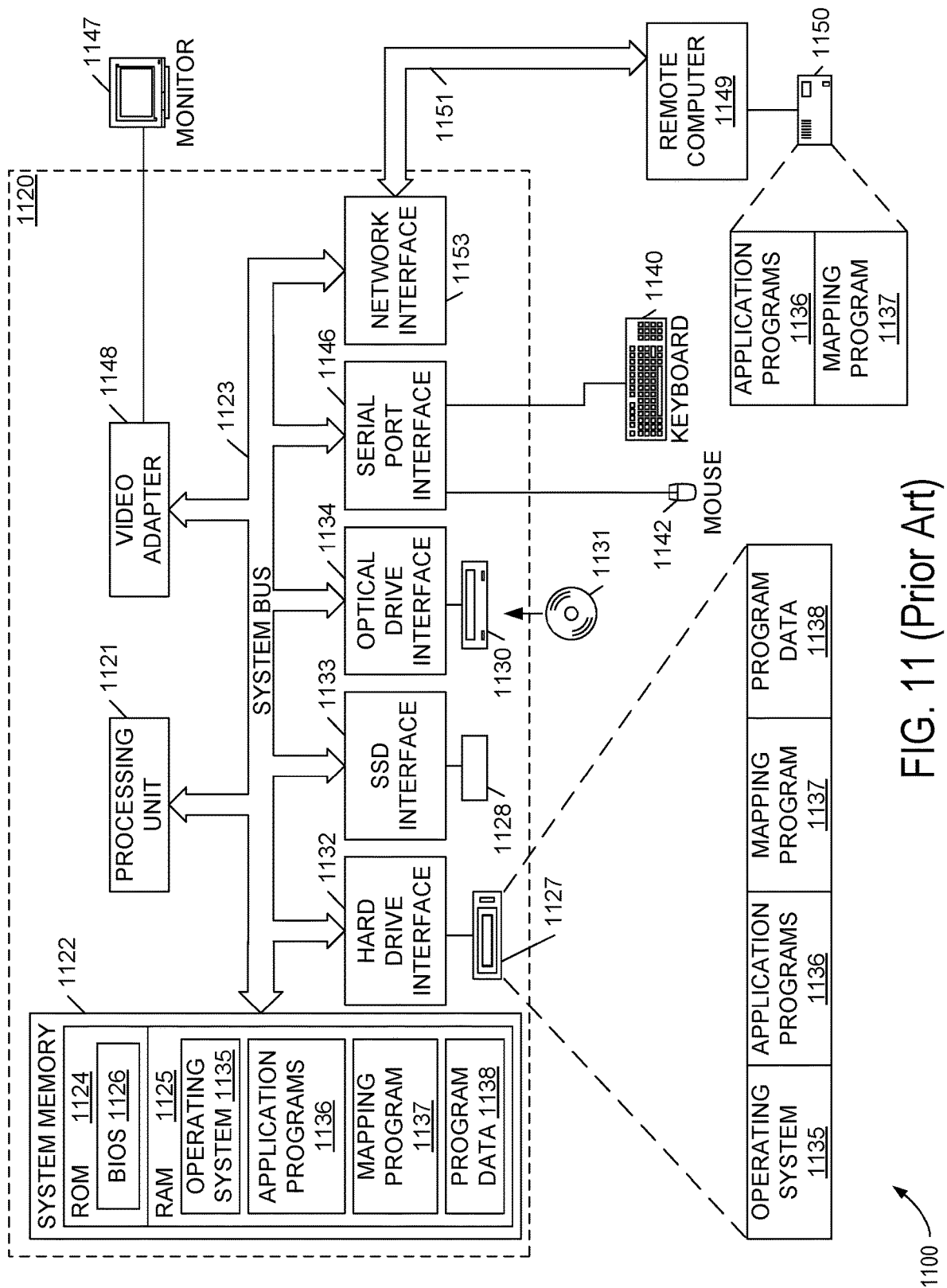
FIG. 11 depicts a computing environment in which the invention may be implemented.

FIG. 11 and the following discussion are intended to provide a brief, general description of a suitable computing environment in which the invention may be implemented. The foregoing examples are described in the general context of computer-executable instructions, such as program modules, executed on client and server computers linked through a communication network, including the Internet. Generally, program modules include routines, programs, objects, components, data structures, etc., that perform particular tasks or implement particular abstract data types. In a distributed computing environment, program modules may be located in both local and remote memory storage devices, and may be executed by client and server computers.

FIG. 11 depicts a general-purpose computing system 1100 that can serve as a client or a server depending on the program modules and components included. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 1100 includes a conventional computer 1120, including a processing unit 1121, a system memory 1122, and a system bus 1123 that couples various system components including the system memory to the processing unit 1121. The system bus 1123 may be any of several types of bus structures, including a memory bus or memory controller, a peripheral bus, and a local bus using any of a variety of bus architectures. The system memory includes read only memory (ROM) 1124 and random access memory (RAM) 1125. A basic input/output system 1126 (BIOS), containing the basic routines that help to transfer information between elements within the computer 1120, such as during start-up, is stored in ROM 1124. The computer 1120 further includes a hard disk drive 1127 for reading from and writing to a hard disk, not shown, a solid-state drive 1128 (e.g. NAND flash memory), and an optical disk drive 1130 for reading from or writing to an optical disk 1131 (e.g., a CD or DVD). The hard disk drive 1127 and optical disk drive 1130 are connected to the system bus 1123 by a hard disk drive interface 1132 and an optical drive interface 1134, respectively. The drives and their associated computer-readable media provide nonvolatile storage of computer readable instructions, data structures, program modules and other data for computer 1120. Other types of computer-readable media can be used.

A number of program modules may be stored on the hard disk, solid state disk 1128, optical disk 1131, ROM 1124 or RAM 1125, including an operating system 1135, one or more application programs 1136, other program modules 1137, and program data 1138. A user may enter commands and information into the computer 1120 through input devices such as a keyboard 1140 and pointing device 1142. Other input devices (not shown) may include a microphone, joystick, game pad, satellite dish, scanner, or the like. These and other input devices are often connected to the processing unit 1121 through a serial port interface 1146 that is coupled to the system bus, but may be connected by other interfaces, such as a parallel port, game port or a universal serial bus (USB). A monitor 1147 or other type of display device is also connected to the system bus 1123 via an interface, such as a video adapter 1148. In addition to the monitor, computers can include or be connected to other peripheral devices (not shown), such as speakers and printers.

The computer 1120 may operate in a networked environment using logical connections to one or more remote computers, such as a remote computer 1149. The remote computer 1149 may be another computer, a server, a router, a network PC, a peer device or other common network node, and typically includes many or all of the elements described above relative to the computer 1120, although only a memory storage device 1150 has been illustrated in FIG. 11. The logical connections depicted in FIG. 11 include a network connection 1151, which can support a local area network (LAN) and/or a wide area network (WAN). Such networking environments are commonplace in offices, enterprise-wide computer networks, intranets and the Internet.

Computer 1120 includes a network interface 1153 to communicate with remote computer 1149 via network connection 1151. In a networked environment, program modules depicted relative to the computer 1120, or portions thereof, may be stored in the remote memory storage device.

It will be appreciated that the network connections shown are exemplary and other means of establishing a communications link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. For example, the wireless handheld devices discussed above are "smart phones" that support many services in addition to standard voice functions. Portable computing devices other than smart phones, such as tablet computers, e.g., an iPad manufactured by Apple, Inc. of Cupertino, Calif., and palm-top and lap-top computers, can be equipped as detailed herein to serve as wireless handheld devices. Moreover, some components or devices are shown directly connected to one another while others are shown connected via intermediate components, or wirelessly, e.g., Wi-Fi, Bluetooth, a public WAN, e.g., the Internet, or a cellular network. In each instance, the method of interconnection establishes some desired electrical or logical communication between two or more devices, as will be understood by those of skill in the art. More generally, the term "network" may refer to one or more networks of networks; in other words, one or more interconnected networks of various types such that a node, e.g., a client or server device, communicates via the network with another node. A network may include several types of networks, for example, private or public networks, local (LAN) and wide area (WAN) networks, wired, wireless, and cellular networks, and the Internet.

Communication Stream server 102, and email server 131, may be realized as one or more servers, the servers including one or more services shown within servers 102 and 137, e.g., services 107, 109, 111, 113, 115, 119, 121, 136, 137, and 138. Communication Stream server 102, and email server 131, may also be implemented as discrete servers that include one or more processors, memory, storage, and modules, self-contained within a server having discrete physical boundaries. In this embodiment, communications among the processor, memory, storage, and modules, occur internally. A discrete server may also be embodied virtually, e.g., via VMWARE, or VIRTUALBOX. Servers 102, and 137, may also be implemented in a distributed fashion, e.g., via a "hypervisor" implementation such as VMWARE, or as individual "cloud" services, in which processor, memory, and storage are not necessarily physically co-extensive. For example, processor 105 may be distributed across several physical processors communicating over a local area network. In such implementations, memory 103 may be physically separate from processor 105, and storage 129, and communicate over one or more network links. In one embodiment, a network link is potentially insecure. Some embodiments may therefore support secure links and data encryption for the communications into and out of Communication Stream server 102, and email server 131. The components of servers 102, and 131, may be distributed across local and wide-area networks, including the Internet, as will be readily understood by those of ordinary skill in the art.

Systems and methods for enhancing communication in email applications have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in some implementations with reference to user interfaces and particular hardware. Moreover, the technologies are disclosed above primarily in the context of communication applications; however, the disclosed technologies apply to other data sources and other data types (e.g., collections of other resources, images, audio, web pages, etc.).

Reference in the specification to "some implementations" or "an implementation" means that a particular feature, structure, or characteristic described in connection with the implementation is included in at least some implementations of the disclosed technologies. The appearances of the phrase "in some implementations" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions, and/or formats. Furthermore, the modules, routines, features, attributes, methodologies, and other aspects of the present disclosure can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, and not limiting.

Variations of these embodiments, and variations in usage of these embodiments, including separate or combined embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A computer-implemented method for providing a communication stream for messages, the method comprising:
    receiving a request to create the communication stream, the request specifying users, including at least a first user;
    responsive to the request, creating the communication stream, the communication stream including posts and comments but not including email, the creating including assigning a stream identifier to the communication stream;
    receiving a request specifying a second user, and in response to the request, adding the second user to the communication stream;
    receiving a request specifying a third user, and in response to the request, adding the third user to the communication stream;
    receiving a non-private message from the first user, the non-private message referencing the stream identifier;
    associating the non-private message with the communication stream;
    providing a representation of the communication stream, including the non-private message, to the users;
    receiving a private message from the second user, the private message referencing the non-private message, referencing the stream identifier, and referencing the third user;
    associating the private message with the communication stream, and with the non-private message associated with the communication stream;
    providing a representation of the communication stream, including the non-private message and the private message, to the third user; and
    providing a representation of the communication stream, including the non-private message sans the private message, to the first user.

2. The computer-implemented method of claim 1, the method further comprising providing a representation of the communication stream, including the non-private message and the private message, to the second user.

3. The computer-implemented method of claim 1, the method further comprising, responsive to a request to assign a topic identifier to a message, assigning the topic identifier to the message.

4. The computer-implemented method of claim 3, the method further comprising receiving a request to select one or more messages, and in response to the request to select the one or more messages, selecting the one or more messages.

5. The computer-implemented method of claim 4, wherein the selecting references the topic identifier.

6. The computer-implemented method of claim 1, the method further comprising, receiving a request to transmit a message to an email address, and in response, transmitting the message to the email address.

7. The computer-implemented method of claim 1, wherein the stream identifier includes an email address.

8. The computer-implemented method of claim 7, wherein the request to create the communication stream is included in an email message addressed to the stream identifier.

9. The computer-implemented method of claim 8, the method further comprising transforming the email message to a message.

10. The computer-implemented method of claim 8, wherein the email message includes commands for creating the communication stream.

11. The computer-implemented method of claim 10, wherein one or more of the commands for creating the communication stream are erroneous.

12. The computer-implemented method of claim 11, wherein the email message includes a return address corresponding to a sender, the method further comprising transmitting to the return address, a message identifying errors corresponding to the commands for creating the communication stream.

13. The computer-implemented method of claim 1, wherein a message includes a message type, the message type identifying at least one of a post, a task, an event, a document, a comment, and a message.

14. The computer-implemented method of claim 13, the method further comprising determining the message type automatically.

15. The computer-implemented method of claim 1, wherein the specifying the users further comprises instructions for limiting access of a user to the communication stream.

16. A computer-implemented method for providing a communication stream for messages, the method comprising:
   providing a presentation of an email message to a user, the presentation including a link for initiating a communication stream, the email message identifying one or more users including a first user and a second user, and including a body;
   in response to activating the link:
      creating the communication stream, the creating including assigning a stream identifier to the communication stream, wherein the communication stream does not include email;
      creating a post to the communication stream based on the body, wherein the post includes at least a part of the body; and
      notifying the users.

17. The computer-implemented method of claim 16, the method further comprising:
   including in the notifying the users, an invitation to subscribe to the communication stream;
   receiving a request from the second user to subscribe to the communication stream; and
   responsive to the request, subscribing, and providing a presentation of the communication stream including the post to, the second user.

18. The computer-implemented method of claim 16, wherein the link is activated by the first user.

19. A computer-implemented system for providing a communication stream for messages, the communication stream including posts and comments but not including email, the computer-implemented system comprising:
   a processor;
   storage;
   a memory for holding processor instructions, the processor instructions comprising:
      a first service for providing a user interface for accessing the communication stream;
      a second service for creating and managing the communication stream; and
      a third service for identifying and managing a private message.

20. The computer-implemented system of claim 19, the computer-implemented system further comprising a fourth service for creating and assigning a tag to a message.

21. The computer-implemented system of claim 19, the computer-implemented system further comprising an email server.

22. The computer-implemented system of claim 19, wherein the first service further comprises providing a user interface for accessing an email server.

* * * * *